United States Patent
Rossmann et al.

(10) Patent No.: US 7,260,555 B2
(45) Date of Patent: Aug. 21, 2007

(54) METHOD AND ARCHITECTURE FOR PROVIDING PERVASIVE SECURITY TO DIGITAL ASSETS

(75) Inventors: Alain Rossmann, Palo Alto, CA (US); Patrick Zuili, Palo Alto, CA (US); Michael Michio Ouya, Portola Valley, CA (US); Serge Humpich, Tournan-en-Brie (FR); Chang-Ping Lee, Palo Alto, CA (US); Klimenty Vainstein, Morgan Hill, CA (US); Hal Hilderbrand, Moss Beach, CA (US); Denis Jacques Paul Garcia, Palo Alto, CA (US); Senthilvasan Supramaniam, San Calros, CA (US); Weiqing Huang, Sunnyvale, CA (US); Nicholas Michael Ryan, Sunnyvale, CA (US)

(73) Assignee: Guardian Data Storage, LLC, Wilmington, DE (US)

( * ) Notice: Subject to any disclaimer, the term of this patent is extended or adjusted under 35 U.S.C. 154(b) by 722 days.

(21) Appl. No.: 10/076,254

(22) Filed: Feb. 12, 2002

(65) Prior Publication Data

US 2003/0110131 A1 Jun. 12, 2003

Related U.S. Application Data

(60) Provisional application No. 60/339,634, filed on Dec. 12, 2001.

(51) Int. Cl.
*G06F 99/00* (2006.01)
(52) U.S. Cl. .............................. 705/51; 705/50; 705/59; 713/150; 713/155; 713/182; 713/201
(58) Field of Classification Search .................. 705/51, 705/50, 59; 713/150, 155, 182
See application file for complete search history.

(56) References Cited

U.S. PATENT DOCUMENTS

| | | | |
|---|---|---|---|
| 4,799,258 A | 1/1989 | Davies | 380/21 |
| 5,247,575 A * | 9/1993 | Sprague et al. | 705/53 |
| 5,276,735 A | 1/1994 | Boebert et al. | 380/21 |
| 5,369,702 A | 11/1994 | Shanton | 713/166 |
| 5,375,169 A | 12/1994 | Seheidt | 713/171 |
| 5,499,297 A | 3/1996 | Boebert | 380/23 |
| 5,502,766 A | 3/1996 | Boebert et al. | 380/25 |

(Continued)

OTHER PUBLICATIONS

"Inside Encrypting File System", Part 1, from MSDN Oct. 2001 version, exact publication date is unknown but believed prior to Dec. 12, 2001.

(Continued)

*Primary Examiner*—Firmin Backer
(74) *Attorney, Agent, or Firm*—Sterne, Kessler, Goldstein & Fox P.L.L.C.

(57) ABSTRACT

Techniques for providing pervasive security to digital assets are disclosed. According to one aspect of the techniques, a server is configured to provide access control (AC) management for a user (e.g., a single user, a group of users, software agents or devices) with a need to access secured data. Within the server module, various access rules for the secured data and/or access privileges for the user can be created, updated and managed so that the user with the proper access privileges can access the secured documents if granted by the corresponding access rules in the secured data.

85 Claims, 30 Drawing Sheets

U.S. PATENT DOCUMENTS

| | | | |
|---|---|---|---|
| 5,600,722 A | 2/1997 | Yamaguchi et al. | 380/21 |
| 5,680,452 A | 10/1997 | Shanton | 713/171 |
| 5,717,755 A | 2/1998 | Shanton | 713/166 |
| 5,745,573 A | 4/1998 | Lipner et al. | 380/21 |
| 5,787,173 A | 7/1998 | Seheidt | 380/277 |
| 5,835,601 A | 11/1998 | Shimbo | |
| 5,862,325 A | 1/1999 | Reed et al. | 395/200.31 |
| 5,898,781 A | 4/1999 | Shanton | 713/166 |
| 5,933,498 A | 8/1999 | Schneck et al. | 380/4 |
| 5,987,440 A | 11/1999 | O'Neil et al. | 705/44 |
| 6,044,155 A | 3/2000 | Thomlinson | |
| 6,088,717 A | 7/2000 | Reed et al. | 709/201 |
| 6,088,805 A | 7/2000 | Davis et al. | 713/202 |
| 6,098,056 A | 8/2000 | Rusnak et al. | 705/75 |
| 6,105,131 A * | 8/2000 | Carroll | 713/155 |
| 6,134,327 A * | 10/2000 | Van Oorschot | 380/30 |
| 6,158,010 A | 12/2000 | Moriconi et al. | 713/201 |
| 6,161,139 A | 12/2000 | Win et al. | 709/229 |
| 6,182,142 B1 | 1/2001 | Win et al. | 709/229 |
| 6,226,745 B1 | 5/2001 | Wiederhold et al. | 713/200 |
| 6,249,873 B1 | 6/2001 | Richard et al. | 713/200 |
| 6,272,631 B1 | 8/2001 | Thomlinson et al. | 713/155 |
| 6,272,632 B1 | 8/2001 | Carmen et al. | 713/168 |
| 6,289,450 B1 | 9/2001 | Pensak et al. | 713/167 |
| 6,314,409 B2 | 11/2001 | Schneck et al. | 705/54 |
| 6,339,825 B2 | 1/2002 | Pensak et al. | 713/158 |
| 6,490,680 B1 | 12/2002 | Scheidt | 713/166 |
| 6,542,608 B2 | 4/2003 | Scheidt | 380/44 |
| 6,549,623 B1 | 4/2003 | Scheidt | 380/44 |
| 2001/0021926 A1 | 9/2001 | Schneck et al. | |
| 2002/0010679 A1 | 1/2002 | Felsher | |
| 2002/0016922 A1 | 2/2002 | Richards | |
| 2002/0029340 A1 * | 3/2002 | Pensak et al. | 713/182 |
| 2002/0078361 A1 * | 6/2002 | Giroux et al. | 713/183 |
| 2003/0033528 A1 * | 2/2003 | Ozog et al. | 713/170 |
| 2003/0182579 A1 * | 9/2003 | Leporini et al. | 713/201 |
| 2004/0215956 A1 * | 10/2004 | Venkatachary et al. | 713/150 |
| 2004/0243853 A1 * | 12/2004 | Swander et al. | 713/201 |

OTHER PUBLICATIONS

"Inside Encrypting File System", Part 2, from MSDN Oct. 2001 version, exact publication date is unknown but believed prior to Dec. 12, 2001.

"Security with Encrypting File System", from MSDN Oct. 2001 version, exact publication date is unknown but believed prior to Dec. 12, 2001.

"How EFS Works", from MSDN Oct. 2001 version, exact publication date is unknown but believed prior to Dec. 12, 2001.

"Encrypting File System", from MSDN Oct. 2001 version, exact publication date is unknown but believed prior to Dec. 12, 2001.

"Features of EFS", from MSDN Oct. 2001 version, exact publication date is unknown but believed prior to Dec. 12, 2001.

"Windows 2000 EFS", in the Apr. 1999 issue of *Windows NT Magazine*.

* cited by examiner

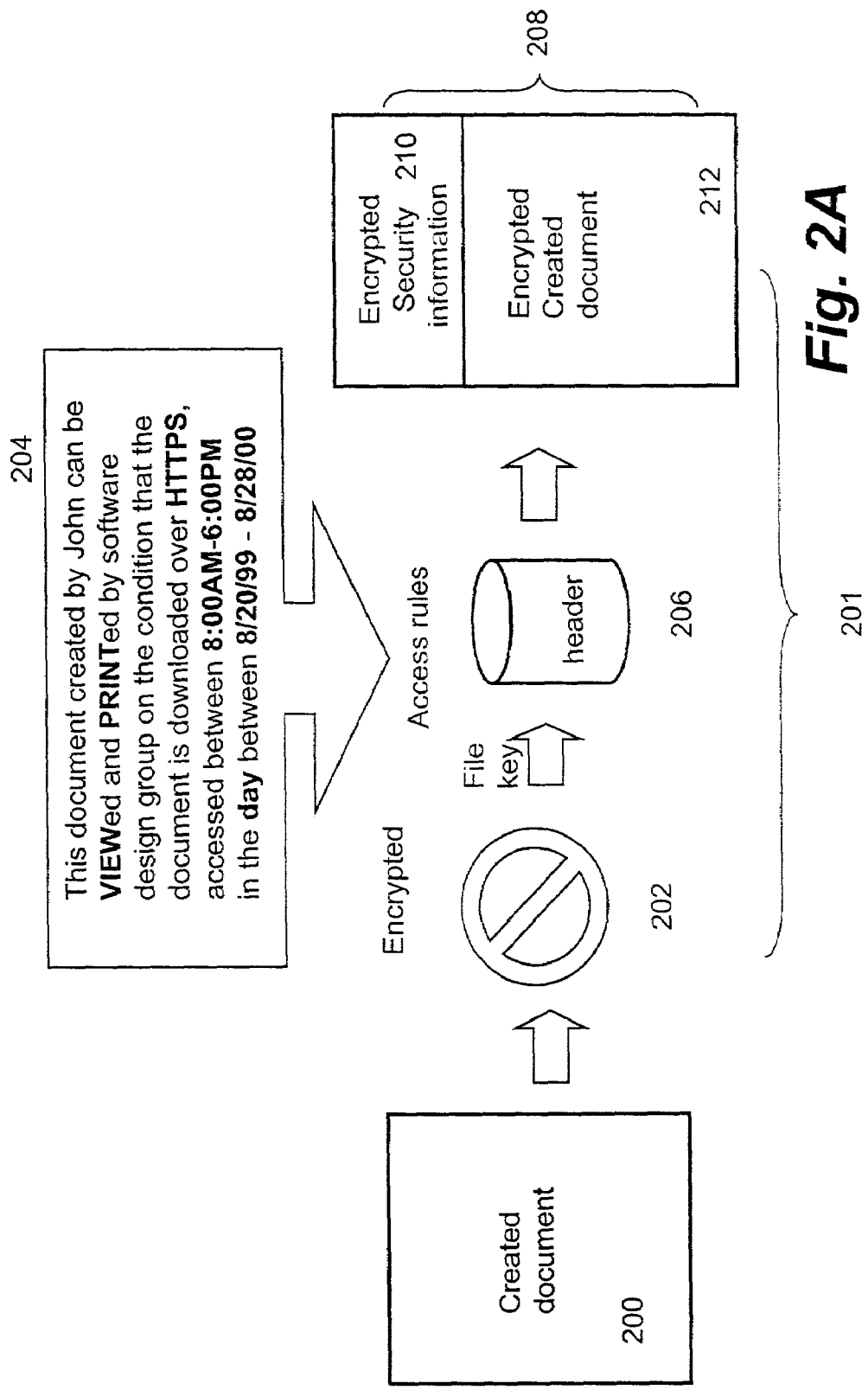

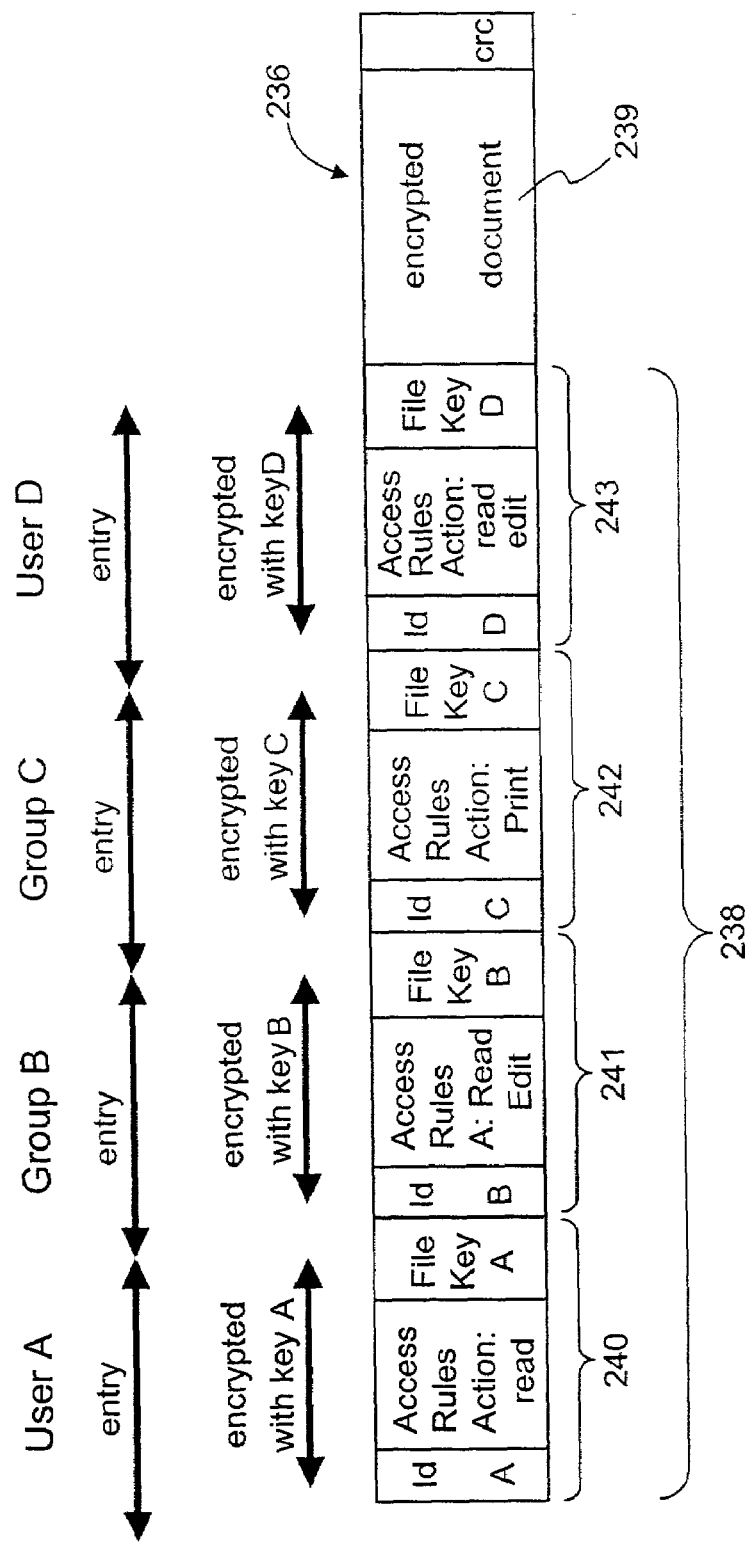
Fig. 2C.1

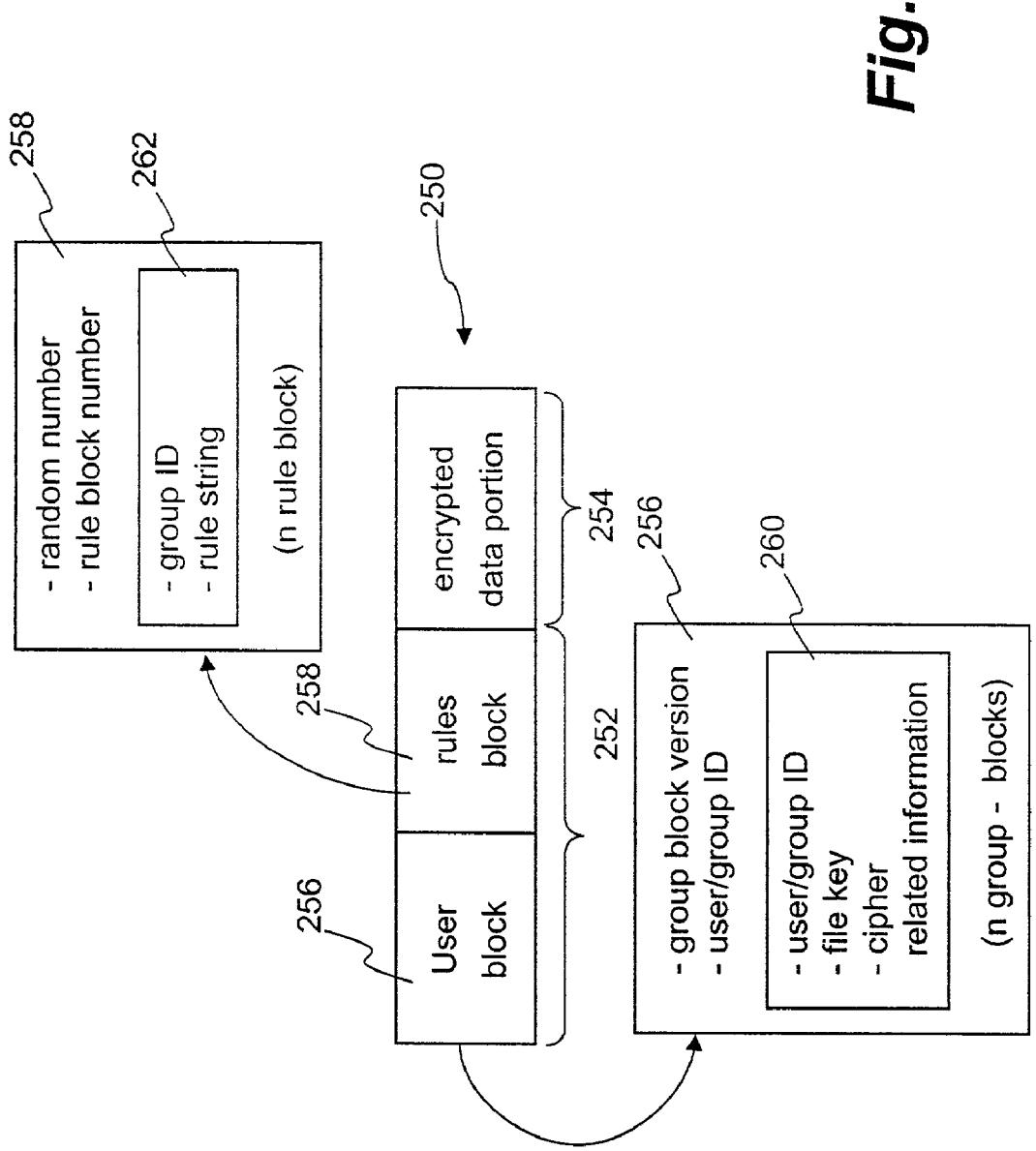
Fig. 2C.2

Fig. 2C.3

```
<header>
  <header_version>
    1.0
  </header_version>
  <key_blocks_list>
    <key_blocks_list_version>
      1.0
    </key_blocks_list_version>
    <key_block>
      <key_block_version>
        1.0
      </key_block_version>
      <group_id> www.xyz.com/marketing </group_id>
<** /* encrypted with Marketing's public-key */
<group_id> www.xyz.com/marketing </group_id>
      <crypto>
        <dek_mat>P39GJ439833IOOE93I5UR93U3945U439</dek_mat>         270
        <enc_algo>
          <name>
            RIJNDAEL
          </name>
          <key_size> 256 </key_size>
          <block_size> 128 </block_size>
        </enc_algo>
        <ses_enc_block_size> 4096 </ses_enc_block_size>
      </crypto>
**>                                                                  267
    </key_block>
    <key_block>
      <key_block_version> 1.0 </key_block_version>
      <group_id> www.xyz.com/engineering </group_id>
<** /* encrypted with User1_Trivial_Group's public-key */
<group_id> www.xyz.com/engineering </group_id>
      <crypto>
        <dek_mat>P39GJ439833IOOE93I5UR93U3945U439</dek_mat>         270
        <enc_algo>
          <name>
            RIJNDAEL
          </name>
          <key_size> 256 </key_size>
          <block_size> 128 </block_size>
        </enc_algo>
        <ses_enc_block_size> 4096 </ses_enc_block_size>
      </crypto>
**>                                                                  268
    </key_block>
  </key_blocks_list>
  <rule_blocks_list>
    <rule_block_list_version> 1.0 </rule_block_list_version>
<secure-info encryption="dek" block-size="1024">
    <rule_block version="1.0">
      <group_id> www.xyz.com/marketing </group_id>
      <rule_xml_string> ... </rule_xml_string>                       271
    </rule_block>
    <rule_block version="1.0">
      <group_id> www.xyz.com/engineering </group_id>
      <rule_xml_string> ... </rule_xml_string>                       272
    </rule_block>
</secure-info>                                                        269
  </rule_blocks_list>
</header>
```

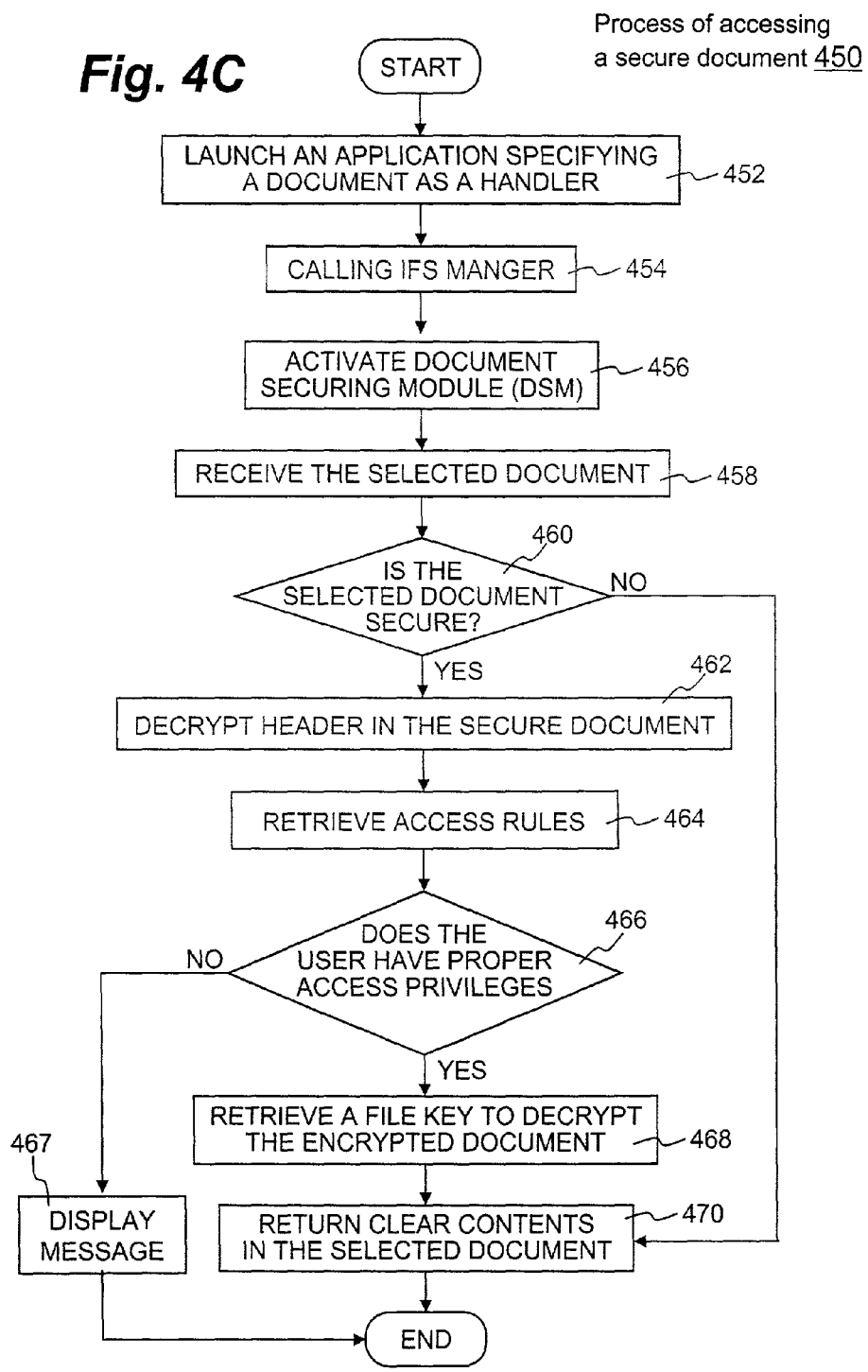

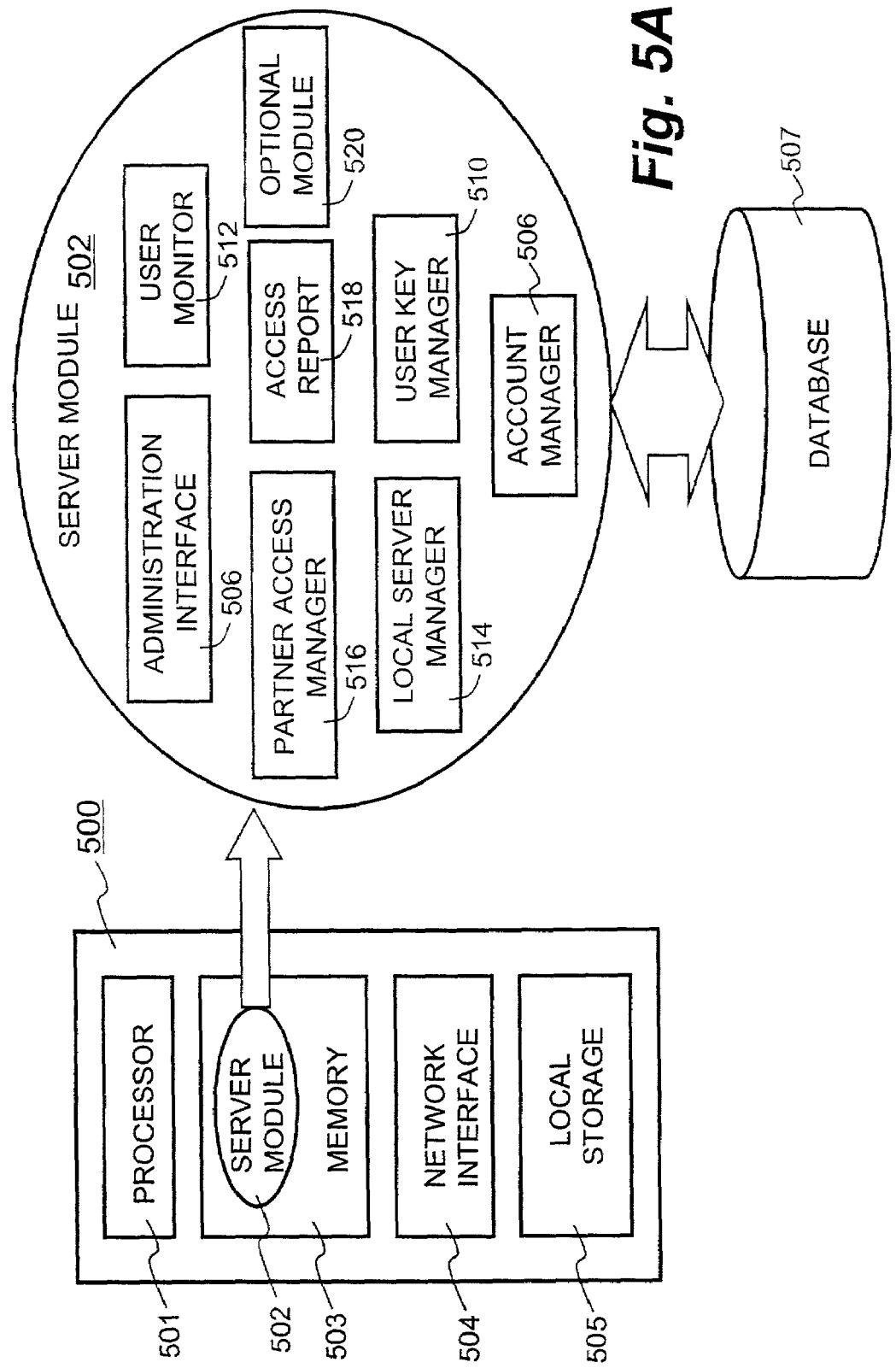

| User ID | User | Open | Edit | Write | Print | Copy | Download | Others |
|---|---|---|---|---|---|---|---|---|
| 01243 | User A | Y | Y | Y | Y | Y | Y | Y |
| 17364 | User B | Y | | | Y | | | |
| 18465 | G User C | Y | Y | Y | | | Y | |

*Fig. 5B.1*

| All user keys | Key/Key pair | Location | others |
|---|---|---|---|
| John's | 1111011010010101 | 128.1.100.64, ... | |
| Mike's, Dell's | 1010110001111111 | 64.100.1.128, ... | |
| Finance group | 0101010101111111 | 64.100.1.100, ... | |

*Fig. 5B.2*

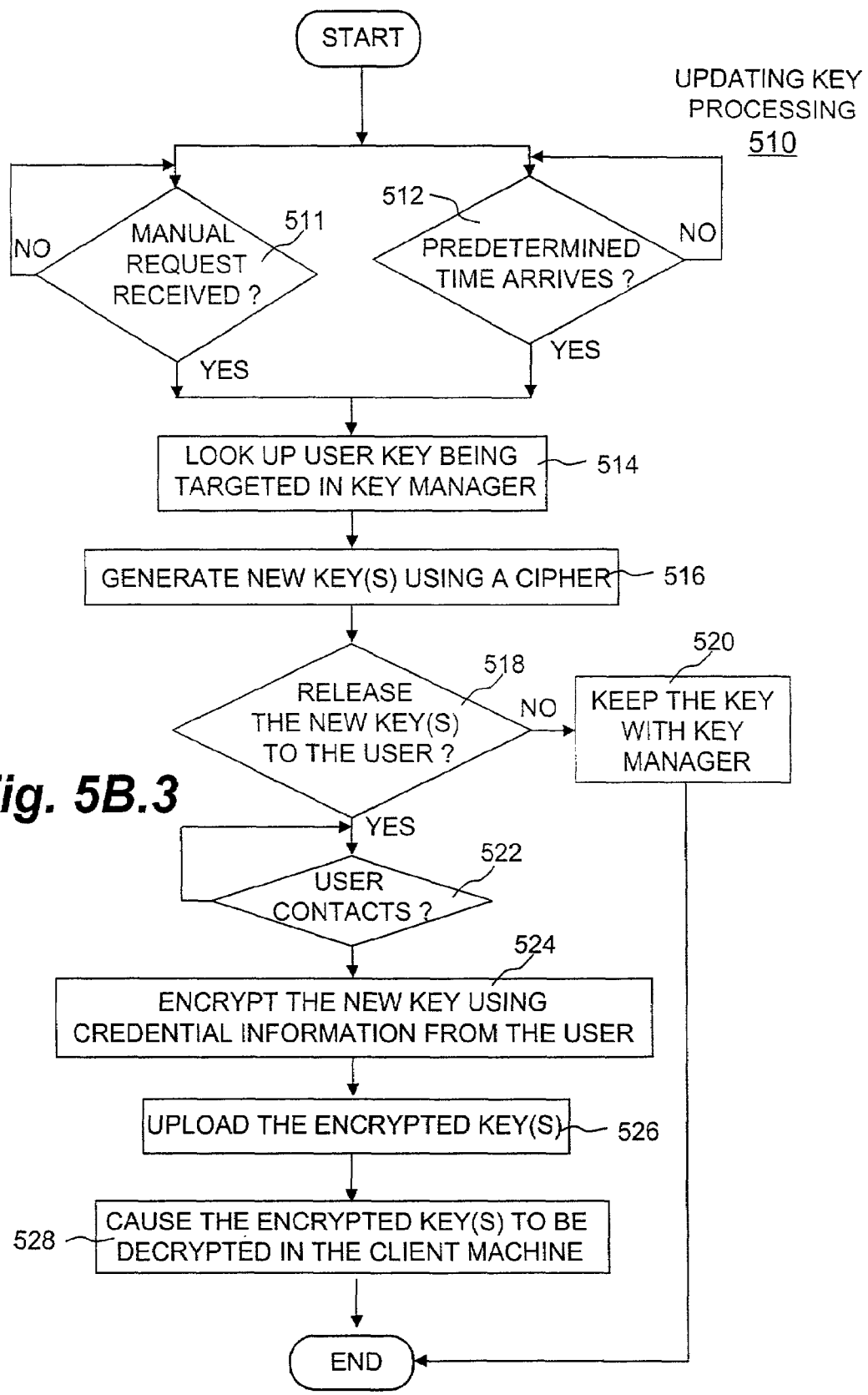
Fig. 5B.3

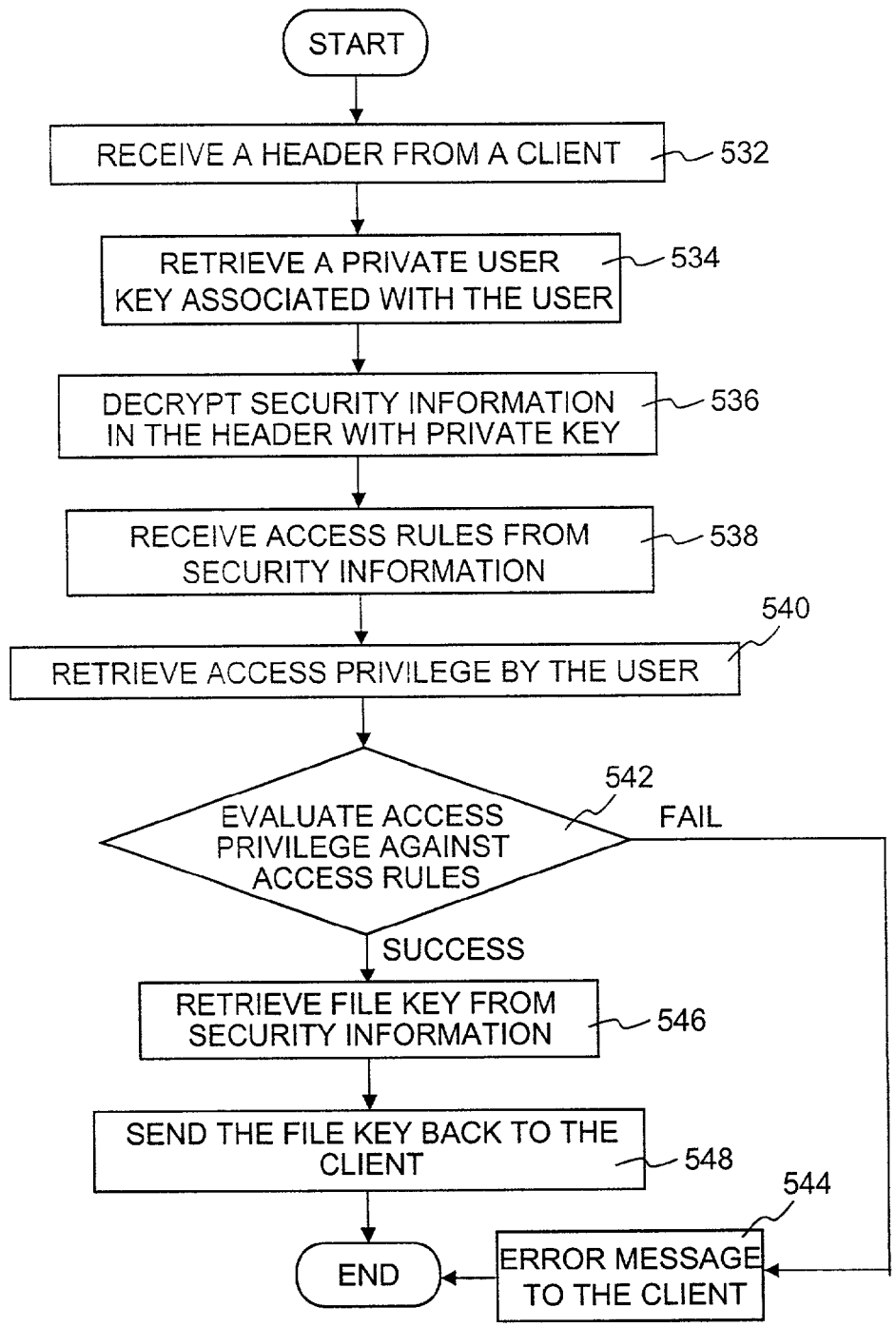
Fig. 5B.4

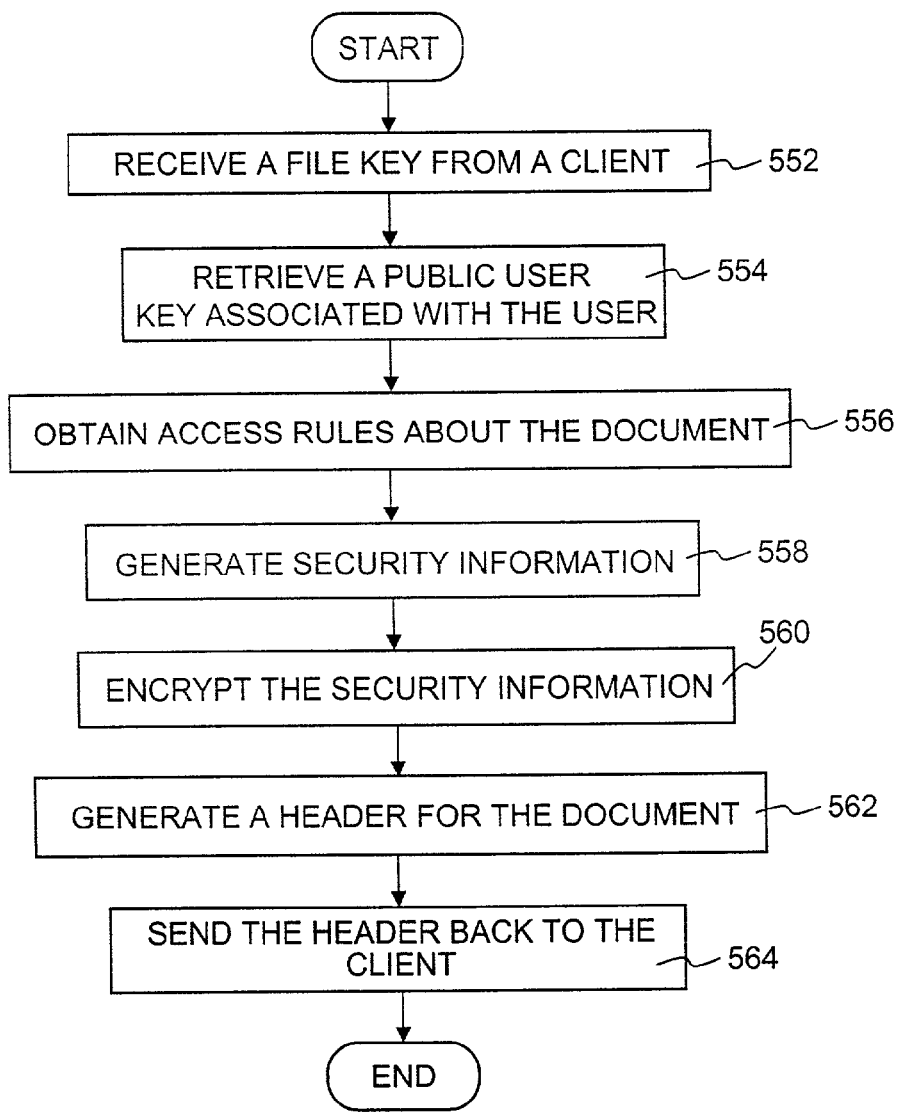
Fig. 5B.5

| USER | PASSWORD | ACCESS PRIVILEGES |
|------|----------|-------------------|
| John | ******** | L=10, T=24, D=ALL, C=ALL — 585 |
| Dell | ******** | L=1, T=8, D=M-F, C=A — 586 |
| Mike | ******** | L=5, T=12, D=M-S, C=A & B — 587 |
| ... | | |

Fig. 5E

For Local Server A

| USER | PASSWORD |
|------|----------|
| John | ******** |
| Dell | ******** |
| Mike | ******** |
| ... | |

For Local Server B

| USER | PASSWORD |
|------|----------|
| John | ******** |
| Mike | ******** |
| ... | |

For Local Server C

| USER | PASSWORD |
|------|----------|
| John | ******** |
| ... | |

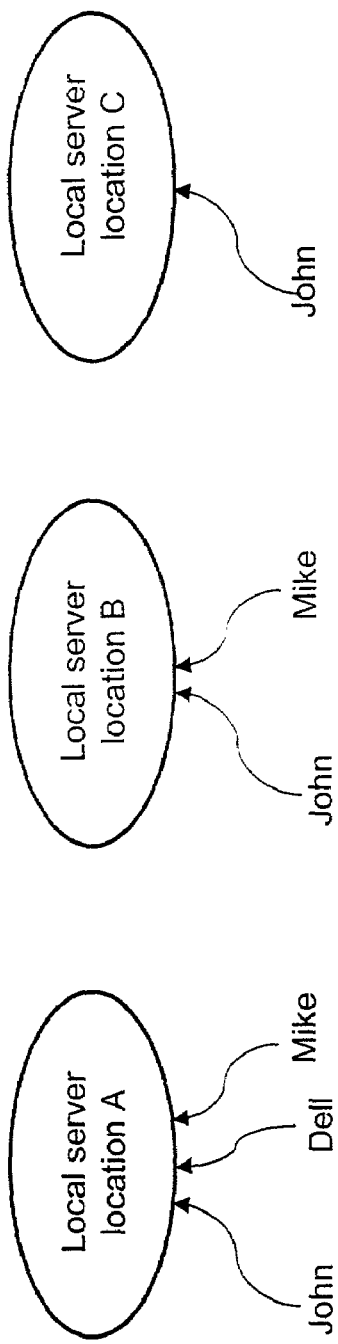
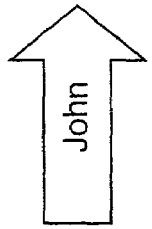
*Fig. 5F*
*Fig. 5G*

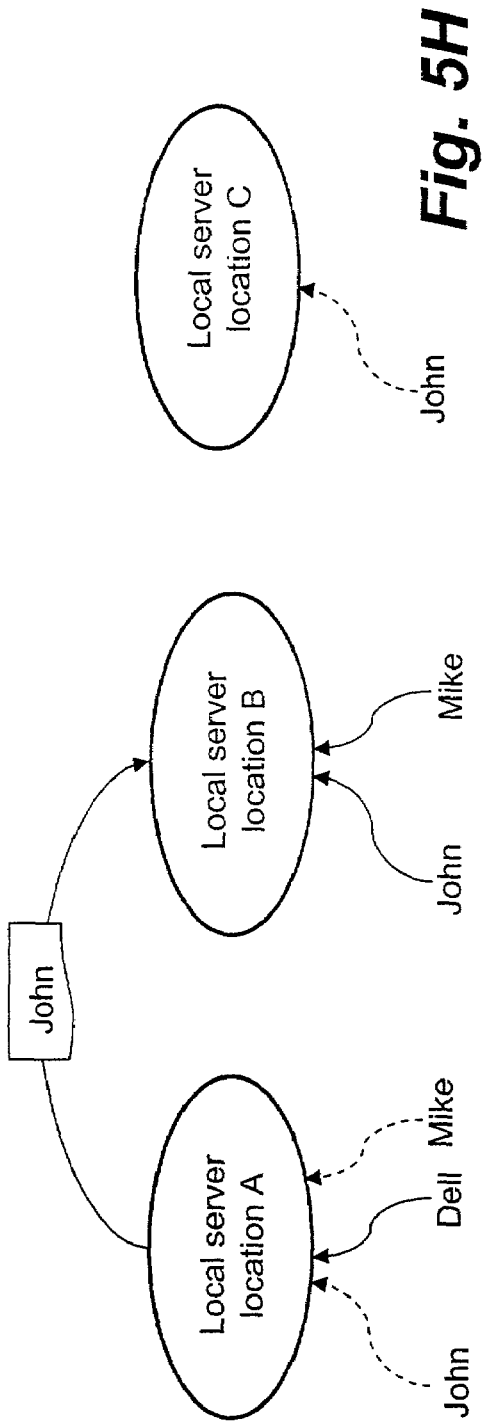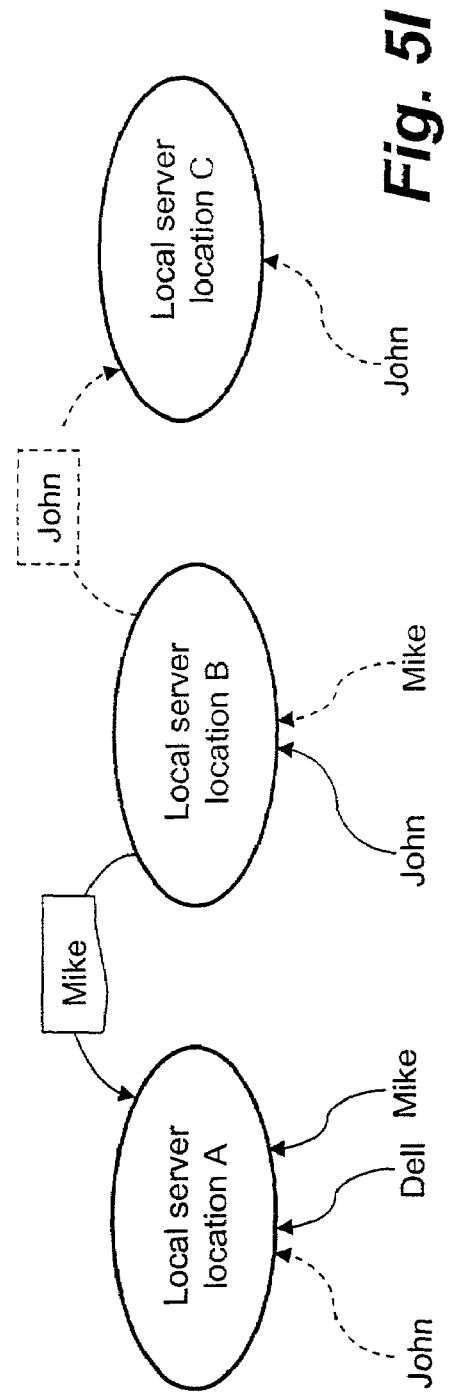

METHOD AND ARCHITECTURE FOR PROVIDING PERVASIVE SECURITY TO DIGITAL ASSETS

CROSS-REFERENCE TO RELATED APPLICATION

This application claims the benefits of U.S. Provisional Application No. 60/339,634, filed Dec. 12, 2001, and entitled "Pervasive Security Systems," which is hereby incorporated by reference for all purposes.

BACKGROUND OF THE INVENTION

1. Field of the Invention

The present invention relates to the area of protecting data in an enterprise environment, and more particularly, relates processes, systems, architectures and software products for providing pervasive security to digital assets at all times.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is a widely open, public and international network of interconnected computers and electronic devices. Without proper security means, an unauthorized person or machine may intercept any information traveling across the Internet and even get access to proprietary information stored in computers that interconnect to the Internet, but are otherwise generally inaccessible by the public.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day hundreds of thousands of people interact electronically, whether it is through e-mail, e-commerce (business conducted over the Internet), ATM machines, or cellular phones. The perpetual increase of information transmitted electronically has lead to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an insecure communication channel without disclosing the contents of the information to anyone eavesdropping on the communication channel. Using an encryption process in a cryptographic technique, one party can protect the contents of the data in transit from access by an unauthorized third party, yet the intended party can read the data using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of the Internet, contractual information, customer data, executive communications, product specifications, and a host of other confidential and proprietary intellectual property remains available and vulnerable to improper access and usage by unauthorized users within or outside a supposedly protected perimeter.

A governmental report from General Accounting Office (GAO) details "significant and pervasive computer security weaknesses at seven organizations within the U.S. Department of Commerce, the widespread computer security weaknesses throughout the organizations have seriously jeopardized the integrity of some of the agency's most sensitive systems." Further it states: "Using readily available software and common techniques, we demonstrated the ability to penetrate sensitive Commerce systems from both inside Commerce and remotely, such as through the Internet," and "Individuals, both within and outside Commerce, could gain unauthorized access to these systems and read, copy, modify, and delete sensitive economic, financial, personnel, and confidential business data . . . " The report further concludes "[i]ntruders could disrupt the operations of systems that are critical to the mission of the department."

In fact, many businesses and organizations have been looking for effective ways to protect their proprietary information. Typically, businesses and organizations have deployed firewalls, Virtual Private Networks (VPNs), and Intrusion Detection Systems (IDS) to provide protection. Unfortunately, these various security means have been proven insufficient to reliably protect proprietary information residing on private networks. For example, depending on passwords to access sensitive documents from within often causes security breaches when the password of a few characters long is leaked or detected. Therefore, there is a need to provide more effective ways to secure and protect digital assets at all times.

SUMMARY OF INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to processes, systems, architectures and software products for providing pervasive security to digital assets at all times and is particularly suitable in an enterprise environment. In general, pervasive security means that digital assets are secured at all times and can only be accessed by authenticated users with appropriate access rights or privileges, wherein the digital assets may include, but not be limited to, various types of documents, multimedia files, data, executable code, images and texts.

In one aspect of the present invention, a server module executable in a server computer is configured to provide access control (AC) management for a group of users, software agents or devices with a need to access secured documents under the access control management. Within the server module, various access rules for the secured documents and/or access privileges for the users or software agents can be created, updated and managed so that the users, software agents or devices with the proper access privileges can access the secured documents if granted by the corresponding access rules in the secured documents. According to one embodiment, a secured document includes a header and encrypted data portion. The header includes encrypted security information to control the access to the encrypted data portion. A user key associated with an authenticated user must be retrieved in order to decrypt the encrypted security information. Once the security information becomes available, the access rules are retrieved from the security information and can be measured against the access privileges of the user who is accessing the secured document. If such measurement succeeds, a file key is retrieved from the security information and used to decrypt the encrypted data portion, subsequently, a clear version of the secured document is made available to the user.

In another aspect of the present invention, the AC management is performed in a distributed fashion. A number of local server computers are employed to operate largely on behalf of a central server responsible for the centralized AC management. Such a distributed fashion ensures the dependability, reliability and scalability of the AC management undertaking by the central server. According to one embodiment, a cache version of the server module is loaded and executed in a local server. As a result, it is not necessary for a client machine to have live consultation with the central server when accessing secured documents. In fact, the secured documents can still be accessed even if the central server is down or a connection thereto is not available.

In still another aspect of the present invention, the local version for a local server can be dynamically reconfigured depending on a user's current location. According to one embodiment, a local version for a local server is so configured that it only services the users, software agents or devices that are local to the local server or have previously been authenticated by the local server. When a user moves from one location to another location, upon detecting a new location of the user who has moved from a previous location, a local version for the new location is reconfigured to add support for the user while at the same time a local version for the previous location is reconfigured to remove support for the user. As a result, the security is enhanced while the AC management can be efficiently carried out to ensure that only one access from the user is permitted at any time across an entire organization, regardless of how many locations the organization has or what access privileges the user may be granted.

In still yet another aspect of the present invention, the format of the secured document is so designed that the security information of a document stays with the document being secured at all times. As such, this integrated mechanism facilities the transportation of secured documents to other locations without the loss of the security information therein and/or creating difficulty of accessing the secured documents from the other locations. According to one embodiment, a secured file or secured document includes two parts: an attachment, referred to as a header, and an encrypted document or data portion. The header includes security information that points to or includes the access rules and a file key. The access rules facilitate restrictive access to the secured document and essentially determine who/when/how/where the secured document can be accessed. The file key is used to encrypt/decrypt the encrypted data portion. Only those who have the proper access privileges are permitted to retrieve the file key to encrypt/decrypt the encrypted data portion. Depending on an exact implementation, the header may include other information (e.g., a flag, a signature or version number) to facilitate the detection of the security nature of the document. Alternatively, the two parts, encrypted security information and the encrypted data portion, may be encrypted again to be a secured file or secured document.

In still yet another aspect of the present invention, a client module executable in a client machine is configured to provide access control to the secured documents that may be located in a local store, another computer machine or somewhere over a data network. According to one embodiment, the client module includes a document-securing module that is implemented to operate in an operating system. In particular, the document-securing module operates in a path through which a document being accessed would pass, as such, the document can be examined or detected for the security nature. If the document is secured, the document-securing module obtains a user or group key to decrypt the security information in the header thereof for the access rules. If a user accessing the document is determined to have the access privilege to the secured document, a file key is retrieved from the security information and a cipher module is activated to decrypt the encrypted data portion with the file key. Likewise, if a document is to be secured, the cipher module encrypts clear data from the document to create the encrypted data portion. The document-securing module integrates proper or desired security information with the encrypted data portion to produce the secured document. As the document securing module operates in an operating system, the en/decryption process is transparent to the user.

In still yet another aspect of the present invention, a client module in a client machine activates an off-line access module to provide an off-line access mechanism for those users on the go. When a user decides to be away from a network premises or on a business trip, an off-line access request may be generated by an off-line access module in the client machine and forwarded to an AC server. In response, the AC server may grant the off-line access request to the user as well as the client machine from which the user will access secured documents off-line. According to one embodiment, the AC server may provide amended or tentative access rules, access privileges or a user key that will automatically expire when a predetermined time ends or become invalid the next time the client machine is connected to the AC server. As a result, the user can access some or all the secured documents in the client machine and, at the same time, create secured documents, all accessed or secured with the tentative access rules, access privileges or the user key. During the off-line access period, an access report manager may be activated to record all activities of the user accessing the secured documents. When the client machine is once again connected to the AC server, the access activities of the secured documents can be reported to the AC server to facilitate the access control management and synchronization of the secured documents accessed or created off-line.

One of the objects in the present invention is to provide a generic securing mechanism that can protect secured digital assets at all times.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2A is an illustration diagram of securing a created document;

FIG. 2C.1 illustrates another exemplary structure of a secured document including multiple users' information in a header and an encrypted portion;

FIG. 2C.2 illustrates still another exemplary structure of a secured document including security blocks in a header and an encrypted portion;

FIG. 2C.3 shows an exemplary header in a markup language corresponding to that of the secured document structure illustrated in FIG. 2C.2;

FIG. 4C shows a flowchart of a process of accessing a secured document according to one embodiment, and shall be understood in conjunction with FIG. 3;

FIG. 5A shows a function block diagram of a (access control) server device in which a server module resides in a memory space and is executable by one or more processors in the server device;

FIG. 5B.1 and FIG. 5B.2 illustrate, respectively, two structures, one showing exemplary access privileges for the users and the other showing what may be in a user key manager according to one embodiment of the present invention;

FIG. 5B.3 shows a flowchart of updating a user key process;

FIG. 5B.4 shows a flowchart of a server-assisted process of accessing secured documents according to one embodiment, and shall be understood in conjunction with FIG. 3;

FIG. 5B.5 shows a flowchart of a server assisted process of securing a document according to one embodiment, and shall also be understood in conjunction with FIG. 3;

FIG. 5D shows a table of all the users with different access privilege, the table being managed by a central server;

FIG. 5E shows respective tables, each accessed by a local server, as a result, users need only to check with a corresponding local server; none would be affected if other local servers are down for whatever reasons or are disconnected from the central server;

FIG. 5F illustrates the accessibility for each of the users, instead of having three identical cache modules, each permitting John to access from any of the three locations, only one cache module is configured to permit John to access form one of the three locations at one time;

FIG. 5G shows a dynamic caching access control management by adding John to another cache module that now can service John moved from another location;

FIG. 5H and FIG. 5I show respectively the changing accessibility for user as a result of the dynamic caching access control management;

DETAILED DESCRIPTION OF THE PREFERRED EMBODIMENTS

Figure 1A:
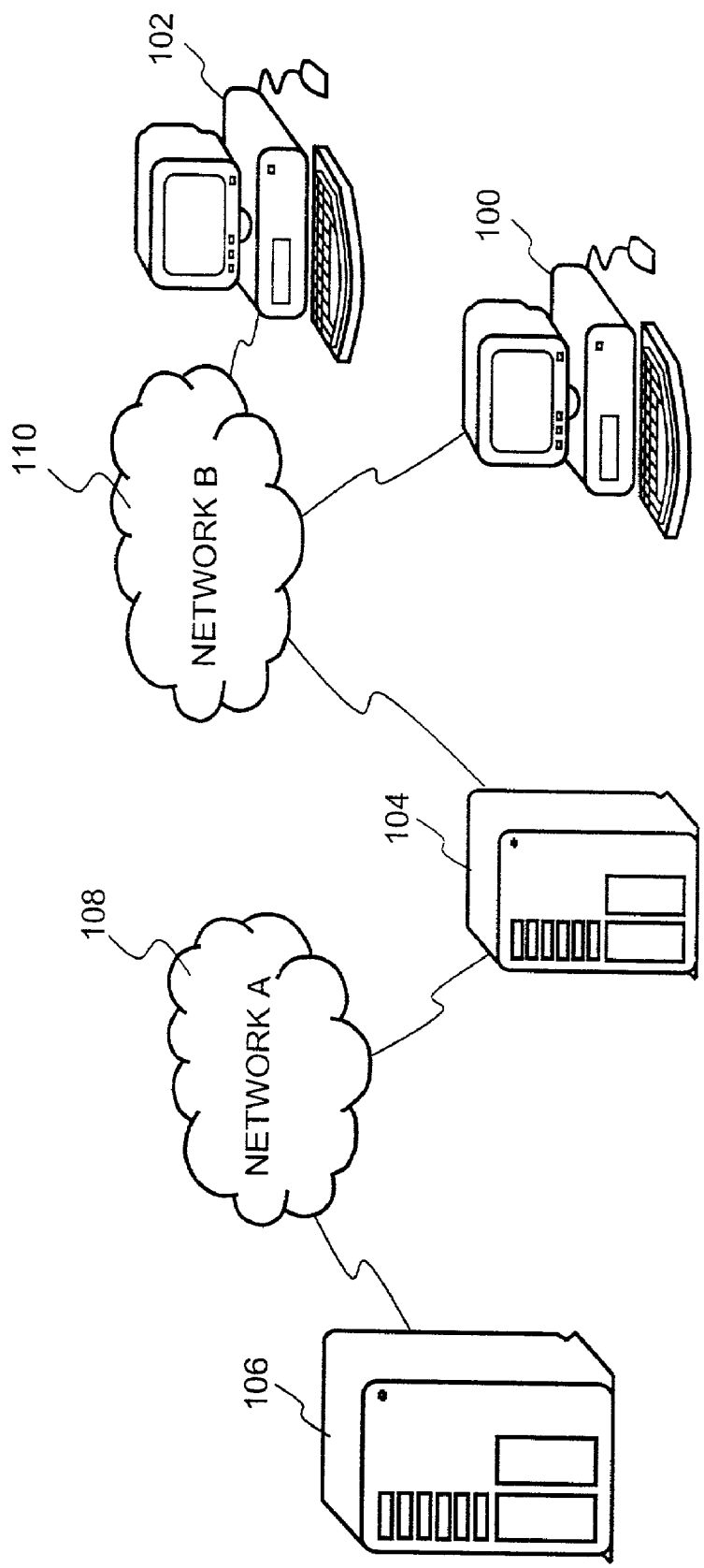
FIG. 1A shows a basic system configuration in which the present invention may be practiced in accordance with a preferred embodiment thereof.

The present invention is related to processes, systems, architectures and software products for providing pervasive security to digital assets at all times. In general, pervasive security means that digital assets are secured at all times and can only be accessed by authenticated users with appropriate access privileges. The present invention is particularly suitable in an enterprise environment.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

To facilitate the description of the present invention, it deems necessary to provide definitions for some terms that will be used throughout the disclosure herein. It should be noted that the definitions following are to facilitate the understanding and describe the present invention according to an embodiment. The definitions may appear to include some limitations with respect to the embodiment, the actual meaning of the terms has applicability well beyond such embodiment, which can be appreciated by those skilled in the art:

Digital Asset—defines a type of electronic data that includes, but is not limited to, various types of documents, multimedia files, streaming data, dynamic or static data, executable code, images and texts.

File or document—interchangeably used herein, indicates one type of digital asset and generally is in a clear mode which means that it can be accessed by one or more applications without a priori knowledge, wherein the access of a file or document is a request that results in the file or document being opened, viewed, edited, played, listened to, printed, or in a format or outcome desired by a user who has requested the access of the file or document.

Secured file or secured document—defines a type of digital asset that cannot be accessed without a priori knowledge. Example of a priori knowledge may include, but not be limited to, a password, a secret phrase, biometric information or one or more keys.

Encrypted file or encrypted document means a file or document that has been encrypted with a cipher (i.e., an implementation of cryptographic techniques).

File key—is one example of a priori knowledge that is also referred to as a cipher key and, once obtained, can be used to unlock or decrypt the encrypted document.

User key—is another cipher key associated with or identifying a user or a group of users and can be used to obtain the file key. According to one format of the secured file, a user key is used to retrieve a file key that, in turn, unlocks or decrypts the encrypted document while a different user key or the same user key may be used to hide or encrypt the file key.

Access privilege—is one or more rights a user may have with respect to a secured file or secured document. A user may only be able to access a secured file from a designated location during a specific period if his/her access privilege limits him/her to do so. Optionally, access privilege may specify other limitations on a specific host whence user is logged in, a file transfer protocol, an access application (model and/or version), a permit to grant access privilege to others (e.g. a consultant) or membership in other groups, etc.

Access rules—are flags or designated permits to limit what a user can do with a secured file or secured document. According to one embodiment of the present invention, at least some of the access rules can be included in a secured file or secured document. In some cases, the access rules may be extensible by a user with appropriate access privilege.

Client device, computer, or machine—interchangeably used herein, is a terminal device typically used by a user to access secured documents.

Server device, computer, or machine—interchangeably used herein, is a computing device. According to one embodiment, such computing device can provide access control (AC) management for secured documents that are accessible from a client machine or a user.

Client module—generally means an executable version of an embodiment of the present invention and typically is loaded in a client device to deliver functions, features, benefits and advantages contemplated in the present invention.

Server module—generally means an executable version of an embodiment of the present invention and typically is loaded in a server device to deliver functions, features, benefits and advantages contemplated in the present invention.

Server and Client—unless otherwise specifically or explicitly stated, a server may mean either a server machine or a server module, a client may mean either a client machine or a client module, and in either case, the particular meaning shall be evident in the context.

Embodiments of the present invention are discussed herein with reference to FIGS. 1A–7C. However, those skilled in the art will readily appreciate that the detailed description given herein with respect to these figures is for explanatory purposes as the invention extends beyond these limited embodiments.

FIG. 1A shows a basic system configuration in which the present invention may be practiced in accordance with one embodiment thereof. Documents or files, such as product descriptions, customer lists and price schedules, may be created using an authoring tool executed on a client computer 100, that may be a desktop computing device, a laptop computer, or a mobile computing device. Exemplary authoring tools may include Microsoft Office (e.g., Microsoft Word, Microsoft PowerPoint, and Microsoft Excel), Adobe FrameMaker and Adobe Photoshop.

According to one embodiment, the client computer 100 is loaded with a client module that is a linked and compiled, or interpreted, version of one embodiment of the present invention and is capable of communicating with a server 104 or 106 over a data network (i.e., the Internet or a local area network). According to another embodiment, the client computer 100 is coupled to the server 104 through a private link. As will be further explained below, a document created by an authoring tool is secured by the client module that will be described in detail below. The client module, when executed, is configured to ensure that a secured document is secured at all times in a store (e.g., a hard disk or other data repository). By virtue of the present invention, the documents are stored in a secured mode and can only be accessed by users with proper access privileges. In general, an access privilege or access privileges for a user may include, but not be limited to, a viewing permit, a copying permit, a printing permit, an editing permit, a transferring permit, an uploading/downloading permit, and a location permit.

According to one embodiment, a created document is caused to go through an encryption process that is preferably transparent to a user. In other words, the created document is encrypted or decrypted under the authoring application so that the user is not aware of the process. A key (referred to herein as a user key) to retrieve a file key to decrypt an encrypted document is associated with an access privilege. Only a user with a proper access privilege can access the secured document.

In one setting, a secured document may be uploaded via the network 110 to a computing or storage device 102 that may serve as a central repository. Although not necessary, the network 110 provides preferably a private link between the computer 100 and the computing device 102. Such link may be provided by an internal network in an enterprise or a secured communication protocol (e.g., VPN and HTTPS) over the Internet. Alternatively, such link may be simply provided by a TCP/IP link. As such, secured documents on the computer 100 may be remotely accessed.

In another setting, the computer 100 and the computing or storage device 102 are inseparable, in which case the computing or storage device 102 may be a local store to retain secured documents or receive secured network resources (e.g. dynamic Web contents, results of a database query, or a live multimedia feed). Regardless of where the secured documents or secured sources are actually located, a user, with a proper access privilege, can access the secured documents or sources from the computer 100 or the device 102 using an application (e.g., Internet Explorer, Microsoft Word or Acrobat Reader).

The server machine 104, sometimes referred to as a local server, is a computing device coupled between a network 108 and the network 110. According to one embodiment, the server 104 executes a local version of a server module of a linked and compiled version of one embodiment of the present invention. As will be detailed below, a local version is a localized server module configured to service a group of designated users or client computers, or a location. Another server machine 106, also referred to as a central server, is a computing device coupled to the network 108. The server 106 executes the server module and provides centralized access control (AC) management for an entire organization or business. Accordingly, respective local modules in local servers, in coordination with the central server, form a distributed mechanism to provide a distributed AC management. Such distributed access control management ensures the dependability, reliability and scalability of centralized AC management undertaken by the central server for an entire enterprise or a business location. As will be further explained below, the server module in the central server maintains or interfaces to a database that includes, but is not limited to, a list of users and corresponding access privileges for the entire organization or business and rules for folders or files, while a local module can be configured to maintain or interface to a portion or whole of the database, hence, servicing a group of users local to the local server.

Figure 1B:
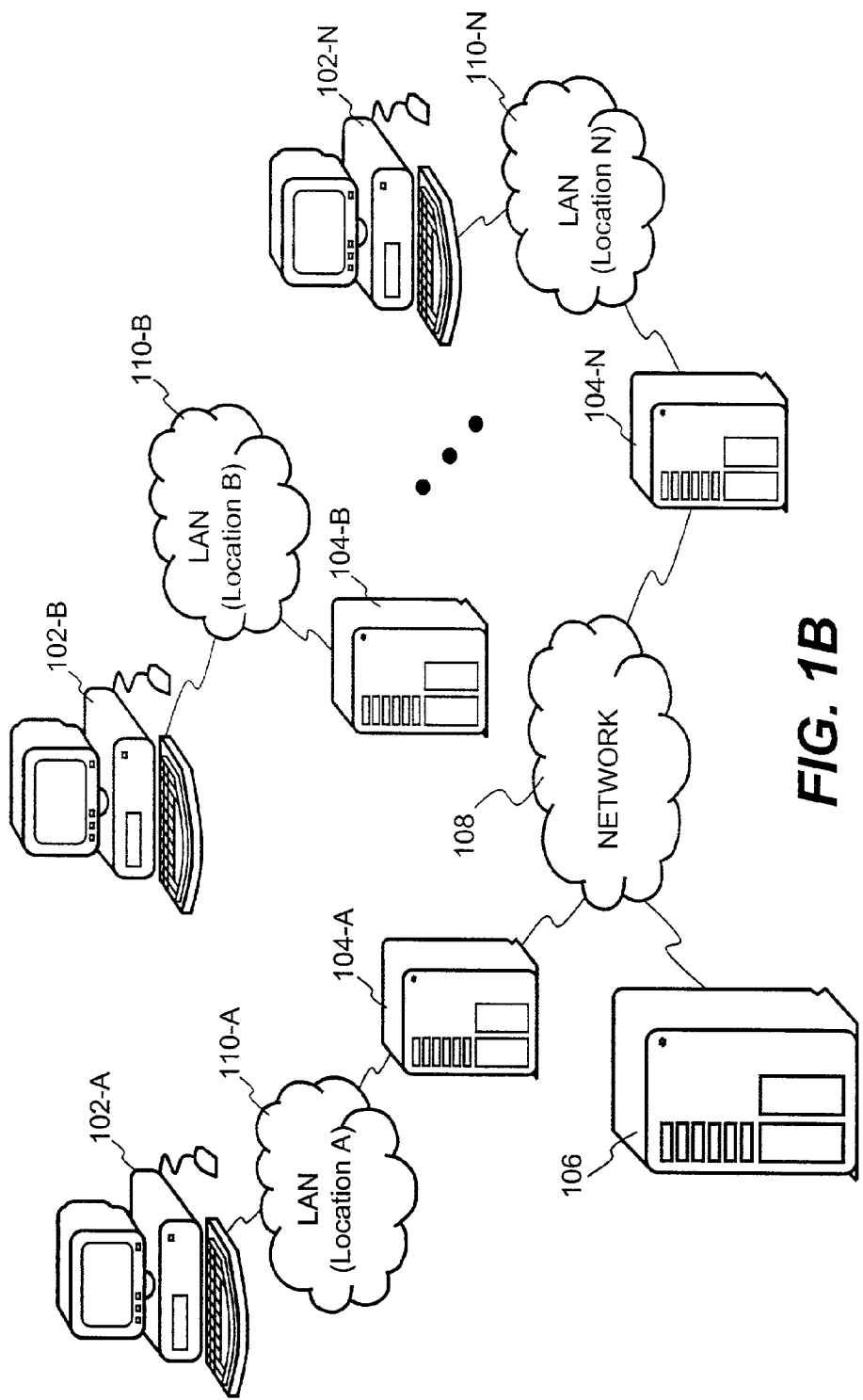
FIG. 1B shows a configuration in which a central server and local servers are employed.

FIG. 1B shows a configuration in which a central server and local servers are employed. The configuration may correspond to a large enterprise having multiple geographic locations or offices. A central server 106 maintains a database managing the access privileges and the access rules in the entire enterprise. One of the features in this configuration is the underlying capability to provide fault tolerance and efficient AC management for a large group of users. Instead of having the central server 106 performing the AC management for each of the users at one single location, a number of local servers 104 (e.g., 104-A, 104-B, . . . and 104-N) are employed in a distributed manner to service the individual locations or offices. Each of local servers 104 executes a local module derived or duplicated from the server module being executed at the central server 106 to manage those users who are local to respective local servers 104. The central server 106 can centralize the AC management in addition to managing the users if necessary.

According to one embodiment, a local module can be a customized version of the server module that runs efficiently for only a few locations or a group of users. For example, a local server 104-A is only responsible for the users or computers 102-A in location A, while a local server 104-B is only responsible for the users or computers 102-B in location B. As a result, even if the central server 106 has to be taken down for maintenance or is not operative at the time a user needs to access secured documents, the access control will not be disruptive. The detailed operation of the local servers 104 in cooperation with the central server 106 will be further described below.

According to another embodiment, a local module is a replicated version of the server module and exchanges any updates with the server module when connected (e.g. periodically or at request). Depending on implementation, part or all of the server module can be duplicated in a local server to ensure that communications with users or their client machines are efficient and fault tolerance. As a result, even if the central server 106 has to be taken down for maintenance or is not operative at the time a user needs to access secured documents, the access control will not be disruptive. For example, in such a situation, any of the local servers 104 can step up and take the place of the central server. When the central server 106 is running or communicating with the local servers 104, information collected at the respective local servers about the users or their activities is sent back to the central server 106. The detailed operation of the local servers 104 in cooperation with the central server 106 in this regard will also be further provided below.

Figure 1C:
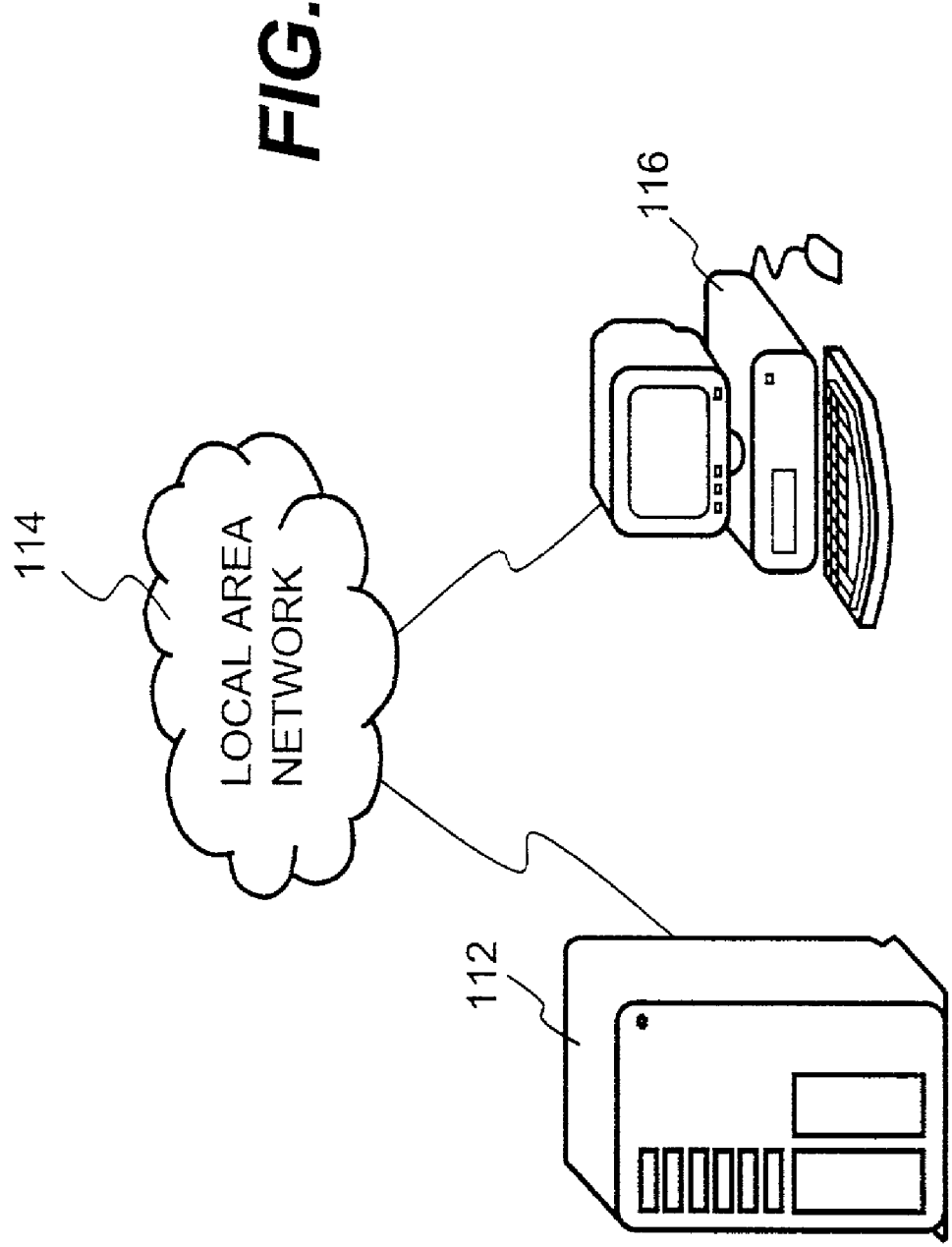
FIG. 1C shows a configuration suitable for a small group of users with no local servers employed.

FIG. 1C shows a configuration suitable for a small group of users. In this configuration, no local servers are employed. A server computer 112 is loaded with the server module and each of the users or terminal computers 116 (only one is shown therein) is loaded with a client module. As a result, the server computer 112 performs the AC management for each of the users or the terminal computers 116.

It should be noted that there is no clear distinction between a small group and a large group of users as far as the number is concerned. Given the description herein, those skilled in the art will understand how to distribute or balance the AC management among one or more other computing devices. To facilitate the following description of the present invention, the setting shown in FIG. 1B will be assumed. Those skilled in the art will understand that the description herein is equally applicable to FIG. 1C or situations in which other possible settings between one or more central servers and one or more local servers are desired.

Figure 1D:
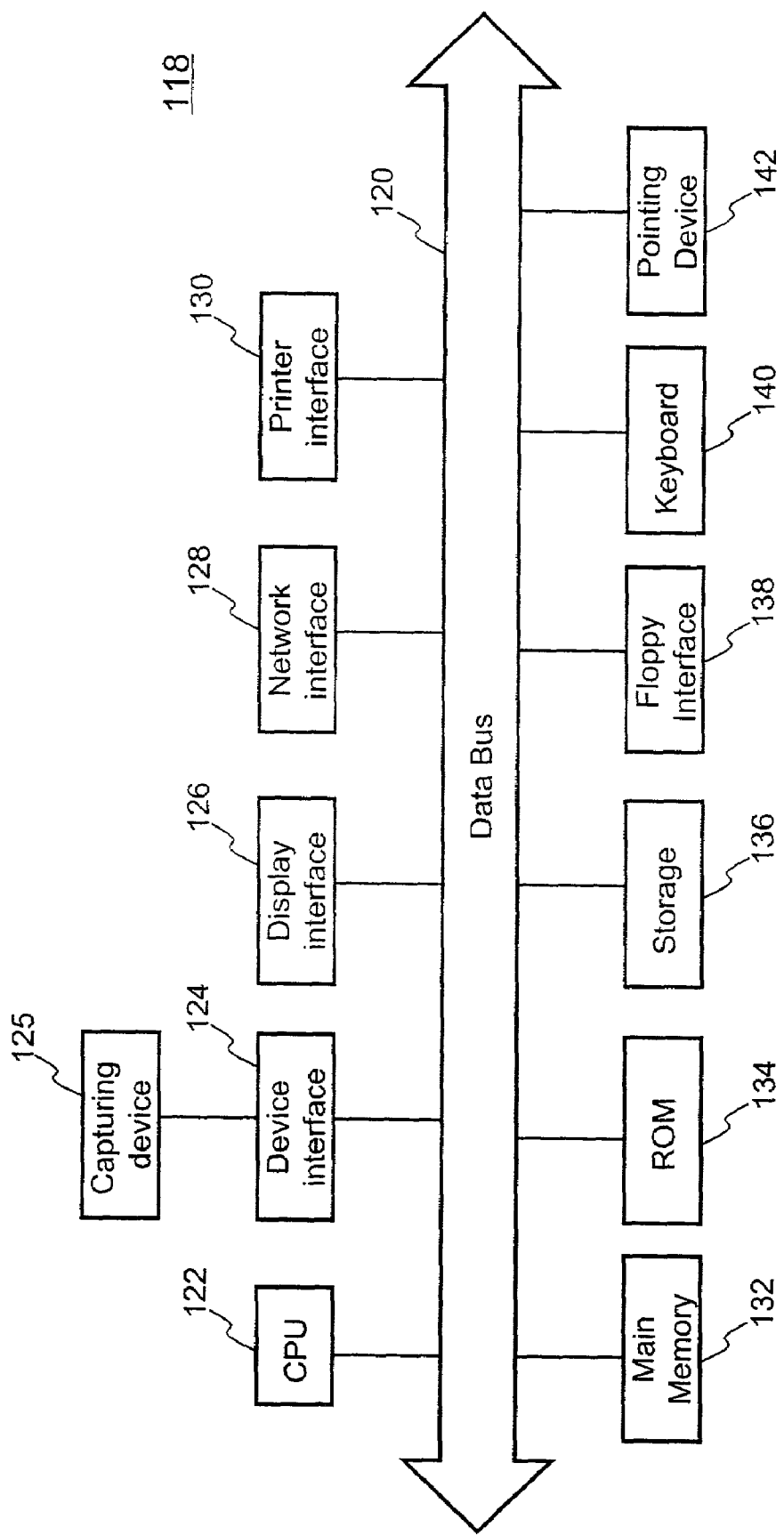
FIG. 1D shows internal construction blocks of a computing device (e.g., a client machine, a central server and a local server) in which the present invention may be implemented and executed.

FIG. 1D shows internal construction blocks of a computing device 118 in which one embodiment of the present invention may be implemented and executed. The device 118 may correspond to a client device (e.g., computer 100, 102 in FIG. 1A and FIG. 1B or computer 116 in FIG. 1C) or a server device (e.g., server 104, 106 in FIG. 1A and FIG. 1B or server 112 in FIG. 1C). As shown in FIG. 1D, the device 118 includes a central processing unit (CPU) 122 interfaced to a data bus 120 and a device interface 124. CPU 122 executes instructions to process data and perhaps manage all devices and interfaces coupled to data bus 120 for synchronized operations. The instructions being executed can, for example, pertain to drivers, operating system, utilities or applications. A device interface 124 may be coupled to an external device, such as the computing device 102 of FIG. 1A, hence, the secured documents therefrom can be received into memory 132 or storage 136 through data bus 120. Also interfaced to data bus 120 is a display interface 126, a network interface 128, a printer interface 130 and a floppy disk drive interface 138. Generally, a client module, a local module or a server module of an executable version of one embodiment of the present invention can be stored to storage 136 through floppy disk drive interface 138, network interface 128, device interface 124 or other interfaces coupled to data bus 120. Execution of such module by CPU 122 can cause the computing device 118 to perform as desired in the present invention. In one embodiment, the device interface 124 provides an interface for communicating with a capturing device 125 (e.g. a finger print sensor, a smart card reader or a voice recorder) to facilitate the authentication of a user of the computing device 118.

Main memory 132, such as random access memory (RAM), is also interfaced to data bus 120 to provide CPU 122 with instructions and access to memory storage 136 for data and other instructions. In particular, when executing stored application program instructions, such as a document securing module in the present invention, CPU 122 is caused to manipulate the data to achieve results contemplated by the present invention. Read-Only Memory (ROM) 134 is provided for storing executable instructions, such as a basic input/output operation system (BIOS) for operation of keyboard 140, display 126 and pointing device 142, if there are any.

Referring now to FIG. 2A, an illustration diagram of securing a created document 200 is shown. After the document 200 is created with an application or authoring tool (e.g., Microsoft WORD), upon an activation of a "Save," "Save As" or "Close" command or automatic saving invoked by an operating system, the application itself, or an application that is previously registered with the server, the created document 200 is caused to undergo a securing process 201. The securing process 201 starts with an encryption process 202, namely the document 200 that has been created or is being written into a store is encrypted by a cipher with a file key. In other words, the encrypted document could not be opened without the file key (i.e., a cipher key).

A set of access rules 204 for the document 200 is received and associated with a header 206. In general, the access rules 204 determine or regulate who and/or how the document 200, once secured, can be accessed. In some cases, the access rules 204 also determine or regulate when or where the document 200 can be accessed. Typically, a header is a file structure, small in size and includes, or perhaps links to, security information about a resultant secured document. Depending on an exact implementation, the security information can be entirely included in a header or pointed to by a pointer that is included in the header. According to one embodiment, the access rules 204, as part of the security information, is included in the header 206. The security information further includes the file key and, in some cases, an off-line access permit (e.g. in the access rules) should such access be requested by an authorized user. The security information is then encrypted by a cipher with a user key associated with an authorized user to produce encrypted security information 210. The encrypted header, if no other information is added thereto, is attached to the encrypted document 212 to generate a secured document 208.

It is understood that a cipher may be implemented based on one of many encryption/decryption schemes. Examples of such schemes may include, but not be limited to, Data Encryption Standard algorithm (DES), Blowfish block cipher and Twofish cipher. Therefore, the operations of the present invention are not limited to a choice of those commonly-used encryption/decryption schemes. Any encryption/decryption scheme that is effective and reliable may be used. Hence, the details of encryption/decryption schemes are not further discussed herein so as to avoid obscuring aspects of the present invention.

In essence, the secured document 208 includes two parts, the document itself and the corresponding security information therefor, both are in encrypted form. To access the document, one needs to obtain the file key that is used to encrypt the document and is now included in the encrypted security information. To obtain the file key, one needs to be authenticated to get a user or group key and pass an access test in which the access rules in the security information are measured against the user's access privilege.

According to one embodiment, the encrypted security information that includes the access rules or the header is placed at the beginning of the encrypted document (data portion) to facilitate early detection of the secured nature of a secured document. One of the advantages of such placement is to enable an access application (i.e., an authoring or viewing tool) to immediately activate a document securing module to decrypt the header. Upon the success of the decryption of the header with an authenticated user key, the access rules can be checked against the user's access privilege. If the user who requested the secured document does have the proper access privilege, the clear contents of the document will be loaded into the access application, otherwise a denial notification (e.g., a message or a blank document) is sent to the user. However, the encrypted security information or the header may be placed anywhere around or in the encrypted document and sometimes may not be embedded contiguously in the encrypted data portion. By the virtue of the present invention, the encrypted header is always attached to the encrypted data portion, namely, the security information stays with the document being secured. This integrated mechanism facilities the transporting of secured documents to other locations without the loss of the security information therein.

One of the features in the present invention is that the document being secured is transparent to the user. In other words, a secured document or file is configured to have a file extension identical to that of the file before being secured so that an application designated to access the file can be executed to access the secured file. For example, a newly created Microsoft word document, xyz.doc, can be accessed by an application WINWORD.EXE. After it goes through the securing process, the secured document is maintained to keep the same file name, i.e., xyz.doc, which still can be accessed by the same application WINWORD.EXE, except now the application may fail to open the document if the access rules therein do not permit a user to do so.

Alternatively, a secured document in a folder appears substantially similar to a regular document and launches the same application when activated except the application would fail to access the contents therein. For example, icons or file names of secured documents may appear in a different color or with a visual indication to distinguish from non-secured documents. When a secured document is unintentionally end up in a machine or readable medium (e.g. CD or disk), if a user of the machine or a machine to read the readable medium has no proper user key or if the user cannot be authenticated, the secured document would not be successfully accessed.

It should be noted that the header in a secured document may be configured differently than noted above of a few formats herein without departing the principles of the present invention. For example, a secured document may include a header with a plurality of encrypted headers, each can be accessible only by one designated user or a group users. Alternatively, a header in a secured document may include more than one set of security information, each set being for one designated user or a group of users while a single file key can be used by all. Some or all of the access rules may be viewed or updated respectively by users who can access the secured document.

As will be further described below, to access a secured document, a user needs a user key or keys to decrypt the encrypted security information or header first. In one embodiment, the key or keys are associated with a user's login to a local server or a central server. Appropriate access privilege associated with the user is validated if the user has been authenticated or previously registered with the server and properly logged in. Depending on the permission or the access privileges, the access rules in the secured document determine whether the contents in the document shall be revealed to the user.

According to one embodiment, the access rules are present in a markup language, such as HTML and SGML. In a preferred embodiment, the markup language is Extensible Access Control Markup Language (XACML) that is essentially an XML specification for expressing policies for information access. In general, XACML can address fine grained control of authorized activities, the effect of characteristics of the access requester, the protocol over which the request is made, authorization based on classes of activities, and content introspection (i.e., authorization based on both the requester and attribute values within the target where the values of the attributes may not be known to the policy writer). In addition, XACML can suggest a policy authorization model to guide implementers of the authorization mechanism.

The following shows an example of the access rules expressed in

```
XACML:
    <rule>
        <doc_type>
            PDF
        </doc_type>
        <grantor name="ACCTG"/>
        <grantee name="MKTG"/>
        <grantee name="PR"/>
        <action>
            VIEW
        </action>
        <action>
            PRINT
        </action>
        <condition>
        <delivery_channels>
            HTTPS
        </delivery_channels>
        <min_time_day>
            1700
        </min_time_day>
        <expiry_date>
            3 Aug, 2002
        </expiry_date>
        </conditions>
    </rule>
```

The literal meaning of the above example is that "any new PDF documents created by ACCTG (accounting group), can be VIEWed and PRINTed by MKTG (marketing group) and PR (public relationship group), on the condition that the documents are downloaded over secured HTTP, accessed before 5:00 PM in the day, before Aug. 3, 2002."

Figure 2B:
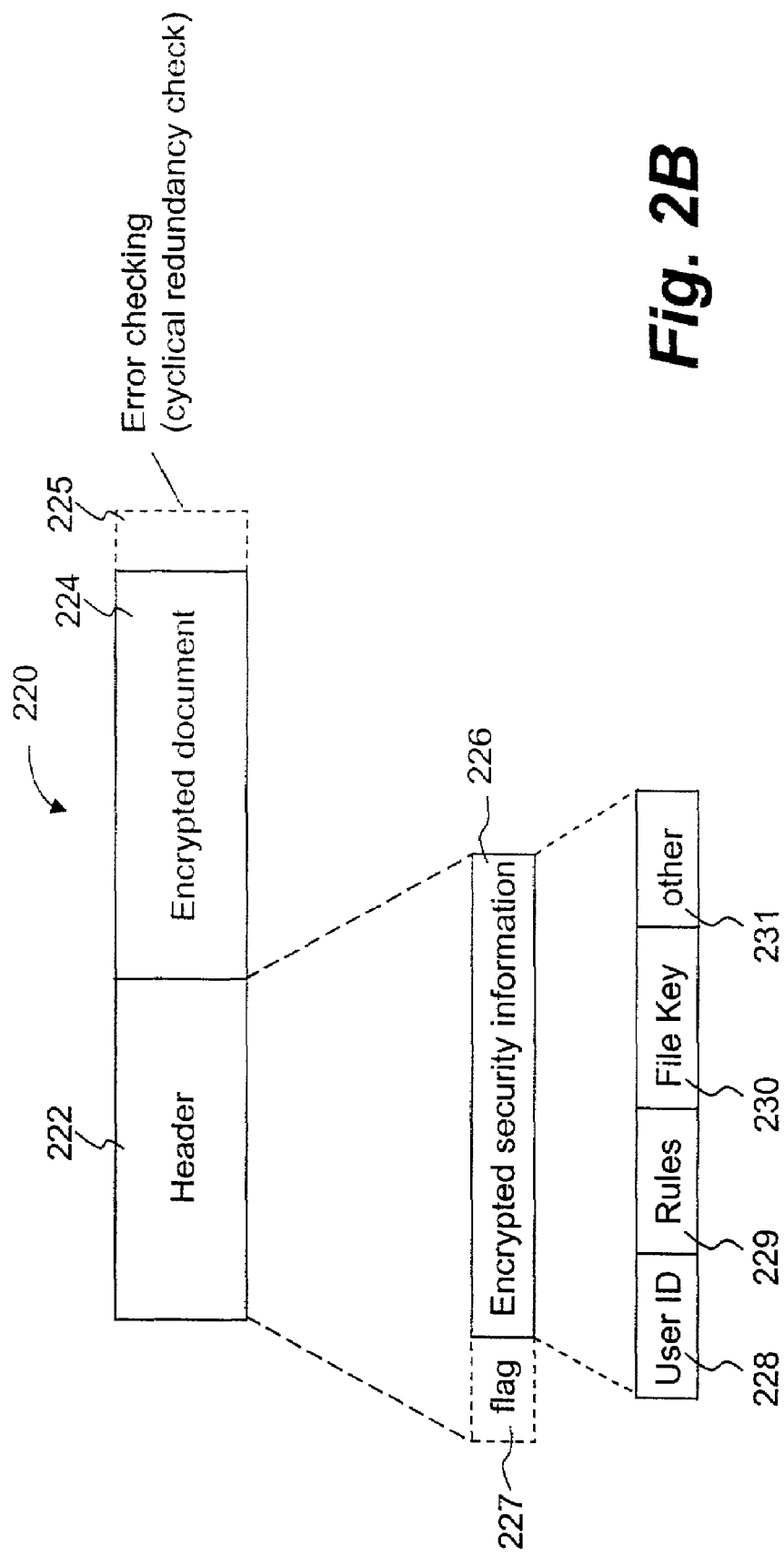
FIG. 2B illustrates an exemplary structure of a secured document including a header and an encrypted data portion.

FIG. 2B illustrates an exemplary structure of a secured document 220 including a header 222 and an encrypted portion 224. The header 222 includes a security information block 226 having encrypted security information that essentially controls the access to the encrypted document 224. In a certain implementation, the header 222 includes a flag 227 (e.g., a predetermined set of data) to indicate that the document 220 is secured. The security information block 226 includes one or more user IDs 228, access rules 229, at least one file key 230 and other information 231. The user IDs 228 maintain a list of authorized users who may be measured against by the access rules 229 before the file key 230 can be retrieved. The access rules 229 determine at least who and how the encrypted document 224 can be accessed. Depending on an implementation, the other information 231 may be used to include other information facilitating a secure access to the encrypted document 224, the example may include version numbers or author identifier.

In general, a document is encrypted with a cipher (e.g., a symmetric or asymmetric encryption scheme). Encryption is the transformation of data into a form that is impossible to read without appropriate knowledge (e.g., a key). Its purpose is to ensure privacy by keeping information hidden from anyone to whom it is not intended, even those who have access to other encrypted data. Decryption is the reverse of encryption. Encryption and decryption generally require the use of some secret information, referred to as a key. For some encryption mechanisms, the same key is used for both encryption and decryption; for other mechanisms, the keys used for encryption and decryption are different. For the purpose of controlling the access to the document, the key or keys, referred collectively to as a file key, may be the same or different keys for encryption and decryption and are preferably included in the security information contained in or pointed to by the header and, once obtained, can be used to decrypt the encrypted document.

To ensure that the key is not to be retrieved or accessible by anyone, the key itself is guarded by the access privileges and rules. If a user requesting the document has the proper access privileges that can be granted by the access rules, the key will be retrieved to proceed with the decryption of the encrypted document.

To ensure that the security information or the header (if no flag is implemented) is not readily revealed, the header itself is encrypted with a cipher. Depending on an exact implementation, the cipher for the header may or may not be identical to the one used for the document. The key (referred to as a user key) to decrypt the encrypted header can, for example, be stored in a local store of a terminal device and activated only when the user associated with it is authenticated. As a result, only an authorized user can access the secured document.

Optionally, the two encrypted portions (i.e., the encrypted header and the encrypted document) can be encrypted again and only decrypted by a user key. In another option, the encrypted portions (either one or all) can be error checked by error checking portion 225, such as using cyclical redundancy check, to ensure that no errors have incurred to the encrypted portion(s) or the secured document 220.

FIG. 2C.1 illustrates an exemplary structure of a secured document 236 including a header 238 and an encrypted portion 239. The header 238 permits four different 240–243 entities to access the secured document 236. The four different entities 240–243 include two individual users and two group users, wherein the group users mean that everyone in a group could access the document with the same privileges. The two individual users have two different access privileges. User A can only read the document while user D can edit and read the document. While everyone in Group B can read and edit the document, everyone in Group C can only print the document. Each entity has a corresponding ID to be associated with the corresponding users and its own access rules. According to one embodiment, the header 238 in the secured document 236 is partitioned into corresponding four sub-headers 240–243, each designated to one user or group and keeping a file key therein and encrypted with a separate user key. In other words, when User A is requesting the secured document 236, only the header 240 designated to User A is decrypted with a user key (e.g., key A) belonging to the user A and authenticated with the user, the rest of the sub-headers 241–243 remain encrypted. In any case, once one of the sub-headers 241–243 is decrypted, the secured document can be decrypted with a key (e.g., file key) retrieved from the decrypted sub-header.

FIG. 2C.2 illustrates another exemplary structure of a secured document 250 including a header 252 and an encrypted portion 254. The header 252 further includes a user block 256 and a rules block 258. The user block 256 includes a clear portion and an encrypted portion 260. The clear portion includes user/group ID(s) and block version number(s). The encrypted portion 260 is encrypted with a user key according to a cipher. If there are N number of distinctive groups/users with possible different access privileges, there will be N such encrypted portions, each encrypted with a corresponding user key. The encrypted portion 260 includes, among other things, the file key that, once retrieved, can be used to decrypt the encrypted data portion 254. In addition, the encrypted portion 260 includes the cipher information to facilitate the encryption/decryption of the encrypted portion 254.

The rules block 258 can be encrypted individually or with the encrypted document 254 using the file key that is eventually stored in the user block 256. One of the advantages of using the file key instead of the individual user key to encrypt the rules block 258 is to provide a mechanism for all authorized users/groups to view who has what access rules and rights. According to one embodiment, a random number or a result from an initialization process (e.g. a vector) may be added in the beginning of the rules block 258 to prevent an attack against the rules block 258.

FIG. 2C.3 shows an exemplary header 266 corresponding to that of the secured document structure in FIG. 2C.2. The header 266 includes a number of segments. In addition to those segments in clear mode, segments 267–269 are encrypted. Specifically, the secured file is configured to be accessed by two groups: marketing and engineering. All users in the two groups are supposed to be able to access the file with an authenticated user key. According to one embodiment, the segment 267 is encrypted with a user key specifically designated to marketing users, while the segment 268 is encrypted with a user key specifically designated to engineering. However, both of the segments 267 and 268 could be respectively encrypted with a single user key. In any event, the encrypted segments in the header 266 include a file key 270 in addition to corresponding cipher information about the cipher being used.

The rules block (i.e., a segment) 269 includes two sets 271 and 272 of access rules (details on rules not shown), one for each of the two user groups. The rules block 269 is encrypted with a key, such as the file key 270 or some other key depending on what cipher is used. According to one embodiment, one of the encrypted segments in the user blocks 267 and 268 shall be decrypted 269 with an authenticated user key to retrieve the file key 270. Before the file key 270 is applied to the decryption of the encrypted data portion, the rules block 269 is decrypted with the file key 270. The access rules are then measured against the access privilege of the user. If the user is not permitted to access the secured document, the file key 270 will not be applied to the decryption of the encrypted data portion. If the user is permitted to access the secured document, the file key 270 will then be applied to the decryption of the encrypted data portion.

It should be noted that FIG. 2C.1, FIG. 2C.2 and FIG. 2C.3 are only exemplary structures of secured documents. In an alternative implementation, the file key necessary to decrypt the document may be encrypted alone and kept in a separate block in the header. The file key becomes retrievable when one of the sub-headers (no longer keeping the file key) is decrypted. In still another alternative implementation, one or more flags or messages may be included in the security information of a secured document, the flags or messages indicate how secure the secured document can be. For example, a secured document can be classified as a normal, confidential, secret or a top-secret document, requiring different level of access. Accordingly, multiple-levels of encryption on the file key and/or access rules may be employed to ensure that only an authorized user or users are permitted to access the secured document. Other implementation options are also possible given the description herein and are not to be listed one by one to avoid obscuring aspects of the present invention.

Figure 2D:
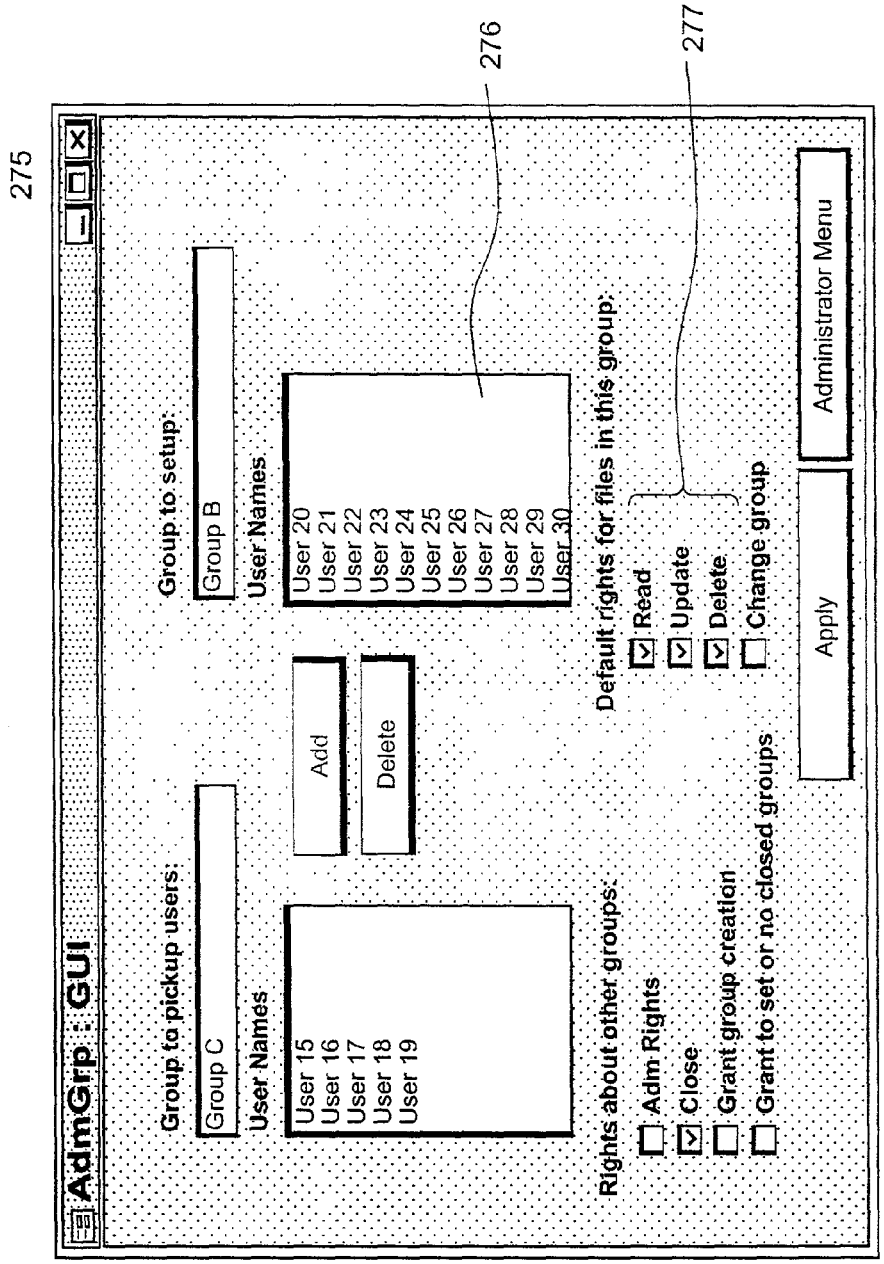
FIG. 2D shows an exemplary graphic user interface (GUI) that can be used to establish or create the access rules by users.

FIG. 2D shows an exemplary graphic user interface (GUI) 275 that can be used to establish or create access rules. The GUI 275 can be activated and/or displayed when a user finishes with a secured document and is ready to save it into a designated place (e.g., a folder or a repository) or a clear or new document is ready to be placed into a designated place. According to one embodiment, all data in the designated place will have substantially similar access rules. Depending on an exact implementation, the GUI 275 can be dynamically generated or controlled by the central server to include users who may have the need to access the data in that designated place. The GUI 275 facilitates the determination of the access rules that the user intends to impose. As shown in FIG. 2D, a selected group of users can be selected to add into an access list 276. Actions 277 determine how the data in the designated place can be accessed. The actions 277 can be set using the GUI 275. As a result, the parameters defining the access rules can be graphically determined and now gathered from the GUI 277 to be included in the document (e.g., in the security information of the header). In one embodiment, the access rules are kept in a temporary file (e.g., in a markup language format) associated with a designated folder and optionally encrypted. The temporary file can then be attached to an encrypted portion when the document is being written as a secured file into a local store.

Sometimes, a user may have a need to export or import a set of predefined access rules. In this case, the temporary file having the access rules may be exported, downloaded or imported into another device or folder. The exportation/importation of access rules provides convenience for a user because the user need not create the access rules from scratch.

Figure 2E:
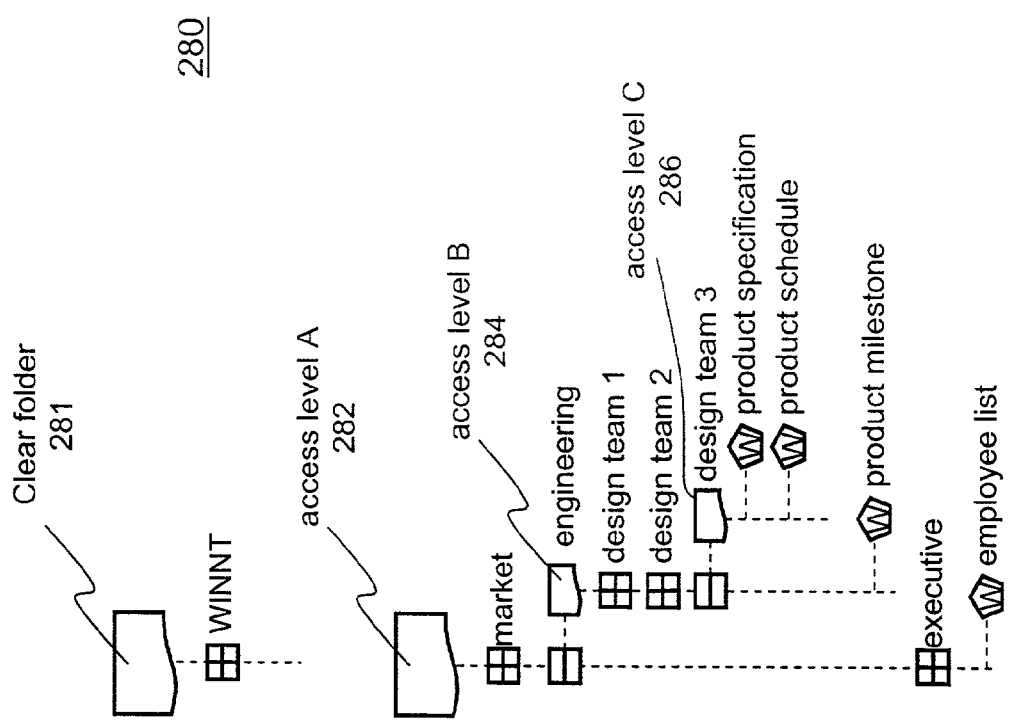
FIG. 2E shows a directory structure including a clear folder and secured (active) folders, wherein the clear folder is generally for storing system files or files that are not intended for protection and the secured folders are for data files and documents in secured form.

One of the features for setting up a set of access rules for a particular place or folder is to provide a securing mechanism for users to create secured documents without specifying as to who/how/when/where the documents can be accessed. FIG. 2E shows a directory structure 280 including a clear folder 281 and a secured folder 282. The clear folder 281 is generally for storing system files or files that are not intended to be protected. The secured folder 282 includes multiple subfolders that can be structured respectively for each access level. For example, a document "employee list" can be accessed by anyone who has access privileges to access level A. Similarly, documents "product milestone" and "product specification" or "product schedule" can be accessed by anyone who has an access privileges to folder 284 for access level B and to folder 286 for access level C, respectively. Likewise, a created document, if placed in folder "design team 2", will be automatically encrypted with the corresponding access rules that will permit only those who has access privileges to access level B. In this embodiment the access levels are hierarchical, meaning that a user with access level A authorization can access not only access A items but also the lower access levels B and C which are subsets of access level A.

Unlike prior art systems in which documents to be secured are encrypted by an encryption process initiated by a user, one of the features in the present invention is to activate a cipher process (i.e., encryption/decryption process) transparently as far as the user is concerned. In order words, the user is not made aware that a document is being made secured through the cipher process while being wrote into a store.

Figure 3:
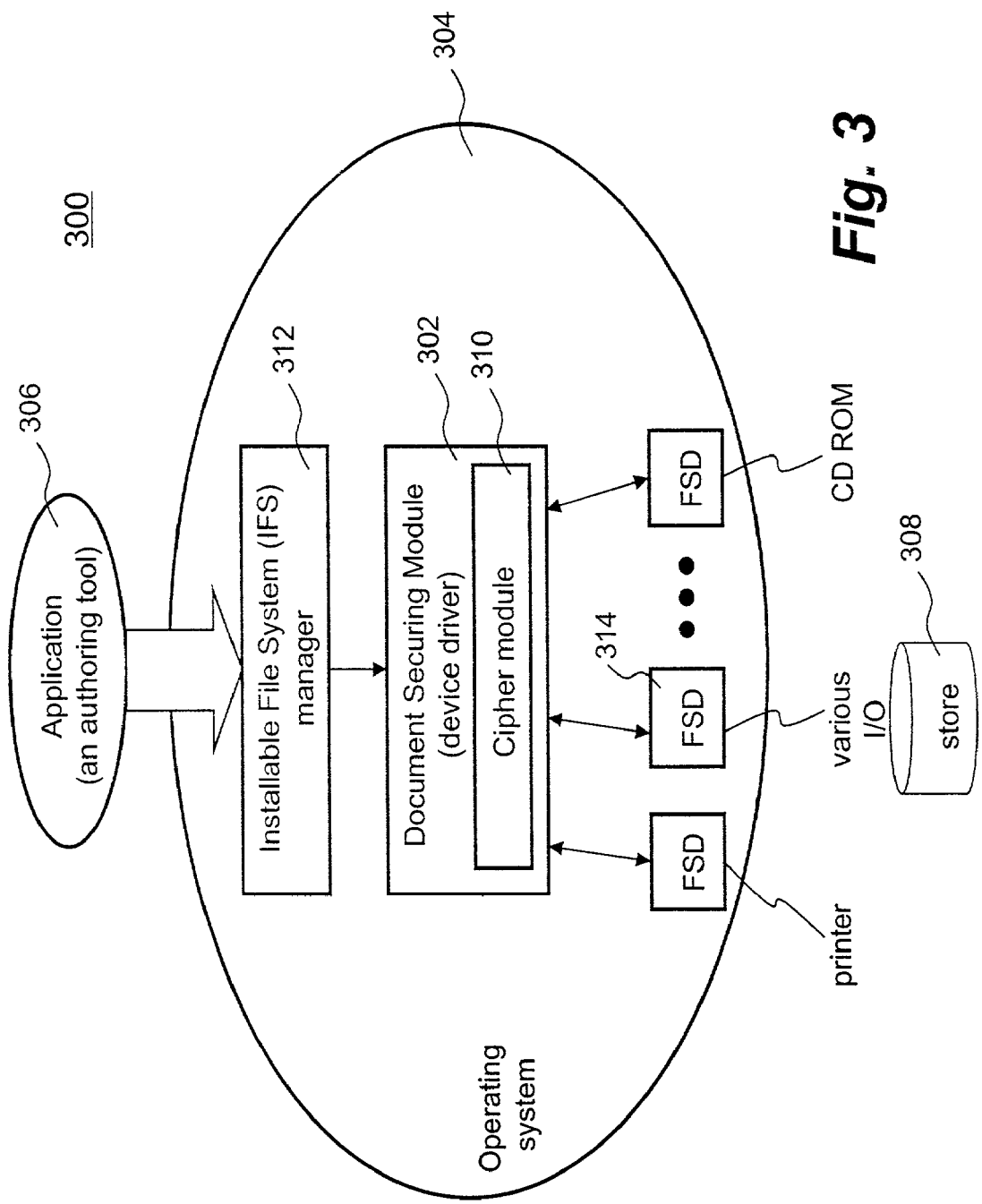
FIG. 3 shows an exemplary implementation of how a document-securing module interacting with and operating within an operating system (e.g., WINDOWS 2000) ensures that a document made secured is transparent to a user.

FIG. 3 shows an exemplary implementation 300 of how a document securing module (DSM) 302 interacting with and operating within an operating system 304 (e.g., WINDOWS 2000) to ensure that a document is made secure in a manner that is transparent to the user.

An application 306 (e.g. a server registered application, such as Microsoft Word) operates over operating system (OS) 304 and may be activated to access a document stored in a store 308. The store 308 may be a local storage place (e.g., hard disk) or remotely located (e.g., another device). Depending on the security nature (secured vs. non-secured) of the document being accessed, the DSM 302 may activate a cipher module 310. According to one embodiment, the DSM 302 is analogous in many ways to a device driver that essentially converts more general input/output instructions of an operating system to messages that a device/module being supported can understand. Depending on the OS in which the present invention is implemented, DSM may be implemented as a VxD (virtual device driver), a kernel or other applicable format. The cipher module 310 is included in or controlled by the DSM 302 and can be activated for operations when a secured document is involved.

In operation, a user selects a secured document that is associated with an application 306 (e.g., MS WORD, PowerPoint, or printing). The application 306 acts on the secured document calls an API (e.g., createFile, a Common Dialog File Open Dialog with Win32 API in MS Windows) to access the installable file system (IFS) manger 312. If it is detected that an "Open" request is made from the application 306, the request is passed to an appropriate file system driver (FSD) 314 to access the requested secured document. At the same time, the cipher module 310 is activated and an authenticated user key is retrieved from a local store to decrypt the header in the requested secure document. If the encrypted header is decrypted and the access rules therein are measured successfully against the user's access privileges, then a file key is retrieved from the header of the secured document and the cipher module 310 proceeds to decrypt the encrypted document in the DSM 302. The clear contents are then returned to the application 306 through the IFS manager 312. For example, if the application 306 is an authoring tool, the clear contents are displayed. If the application 306 is a printing tool, the clear contents are sent to a designated printer.

If it is detected that a "New" request is made, which means a secured document is being created or authored, a file key is generated in the DSM 302 (e.g., by the cipher module 310) and the file key will be subsequently used to encrypt the contents in a document being created. To ensure that the local store always has the encrypted documents, every time, a "Write" request (e.g., a "save" command in Microsoft Word) is made manually by a user or automatically by the application 306 or the OS 304, whatever contents in the document being processed or authored are encrypted by the cipher module 310 with the file key in the DSM 302. When a "Close" request is made, the file key is stored in a header that also includes whatever access rules that the user has applied thereto. The header is then encrypted with an authenticated user key and attached to the encrypted document before the document is sent to the appropriate FSD (e.g., 314) for storage in the store 308 (e.g., a folder or a designated location). As a result, a secured document is created.

In another embodiment, an operating system (OS) access, known as the ProcessID property, can be used to activate an application (as an argument to the AppActivate method). The parameter ProcessID identifies the application and an event handler thereof takes necessary parameters to continue the OS access to the Installable File System (IFS) Manager 312 that is responsible for arbitrating access to different file system components. In particular, the IFS Manager 312 is configured to act as an entry point for processes such as opening, closing, reading, writing files and etc. With one or more flags or parameters passed along, the access activates the DSM 302. If the document being accessed by the application is regular (non-secured), the document will be fetched from one of the File System Driver (FSD) (e.g., FSD 314) and passed through the DSM 302 and subsequently loaded into the application through the IFS Manager 312. On the other hand, if the document being accessed by the application is secured, the DSM 302 activates the cipher module 310 and proceeds to obtain an authenticated user key to retrieve the access rules therein. If the access privileges satisfy the access rules, a file key will be retrieved to decrypt the encrypted data portion of the secured document by the cipher. As a result, the data portion or the document in clear mode will be loaded into the application through the IFS Manager 312.

According to one embodiment, the DSM 302 resides on a local disk (e.g., storage 136 of FIG. 1D) in a file that is structured like a dynamic-link library (DLL), typically with a SYS or IFS extension, and is loaded during system initialization. Once the DSM 302 is installed and initialized, a kernel communicates with it in terms of logical requests for file opens, reads, writes, seeks, closes, and so on. Through the IFS Manager 312, the FSD 314 translates these requests—using control structures and tables found on the volume itself—into requests for sector reads and writes for which it can call special kernel entry points called File System Helpers (FsHlps). The kernel passes the demands for sector I/O to an appropriate device driver and returns the results (e.g., the requested document) to the FSD 314. Upon receiving the results from the FSD 314 indicating that the requested document is secured, the DSM 302 activates the cipher module 310 included therein to decrypt the document if permitted by the access rules in the secured document.

Figure 4A:
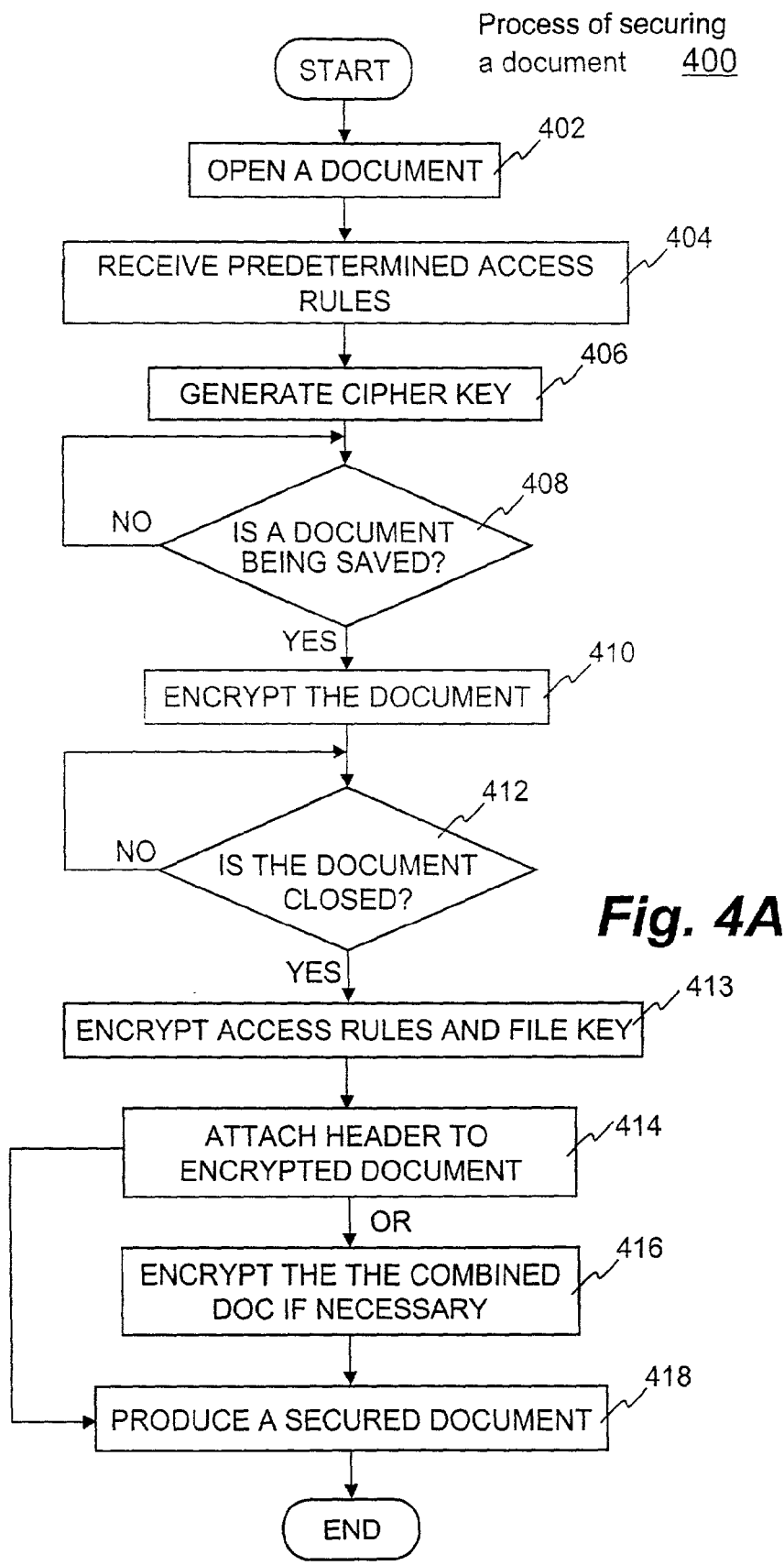
FIG. 4A shows a flowchart of the process of securing a document being created according to one embodiment of the present invention.

FIG. 4A shows a flowchart of a process 400 of securing a document being created according to one embodiment of the present invention. At 402, a blank document is opened or created by an authoring application chosen and activated by a user. In a preferred procedure, the user may save the document in a folder that has already setup with a set of access rules. At 404, the set of predetermined access rules is received, preferably, in a markup language. As described above, the access rules may also be received by importation of a previously created file including desirable access rules, defaults of the user access privileges or individually created user access privileges.

At 406, a secret cipher key (i.e., a file key) is generated from a cipher module for the document and typically stored in a temp file that is generally not accessible by an ordinary user. The temp file will be erased automatically when the secured document is done (e.g., at a "Close" command from the application). At 408, the document is checked to see if a request to write the document into a local store is made. If such request is detected (which could be made manually by the user or periodically by the authoring tool or an OS), the document is encrypted with the file key at 410. One of the features in the present invention is that the stored document is always encrypted in storage even if it is still being processed (e.g., authored, edited or revised). When the user is done with the document, a "Close" request is activated to close the document. At 412, such a request is detected. As soon as such request is received, it means that a secured version of the document is being written into the store. At 413, the access rules and the file key are included in security information that is encrypted with the authenticated user key. Depending on implementation, a flag or signature and the security information can be included in the header. Alternatively, the header could include the security information without a flag. At 414, the header is attached to the encrypted document from 410 and subsequently the secured document is placed into the store at 418.

As described above, the secured document includes two encrypted portions, the header with encrypted security information and the encrypted data portion (i.e., the encrypted document). The two parts in the secured documents are encrypted respectively with two different keys, the file key and the user key. Alternatively, the two encrypted portions may be encrypted again with another key (or use the same user key) at 416.

In the case that there are a number of sets of access rules, each for a particular user or a group of users, it can be understood that the encrypted access rules at 413 are integrated with other sets of the encrypted access rules in a rules block as illustrated in FIG. 2C.2. As such, an access from one user or group will not affect other users or groups but the other users or groups will see perhaps an updated version of the encrypted document.

Figure 4B:
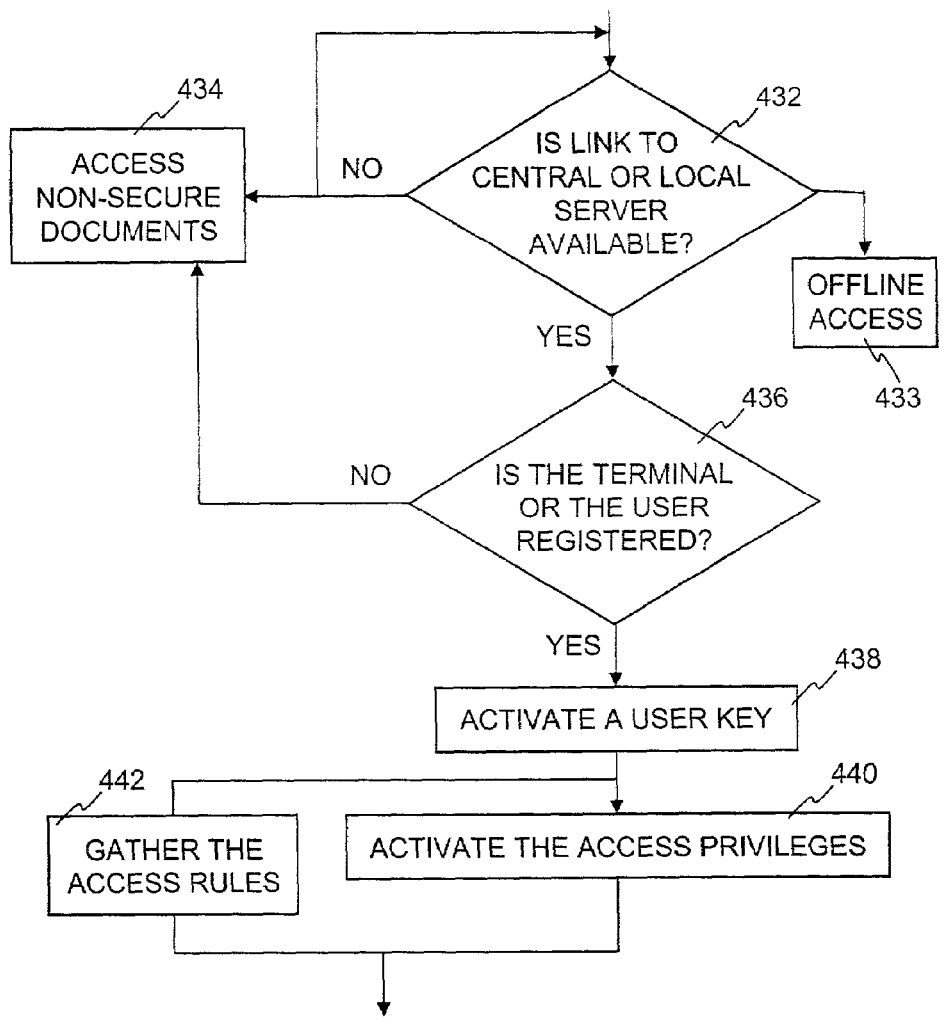
FIG. 4B shows a flowchart of an exemplary process of receiving the access rules and may be incorporated into the process of FIG. 4A to facilitate the process of securing a document.

FIG. 4B shows a flowchart of an exemplary process 430 of receiving the access rules. The process 430 may be performed at 404 in FIG. 4A to facilitate the process of securing a document. To put less burden on a user, the present invention, as will be further described below, provides a one-time authentication mechanism, which significantly differs from prior art systems in which user authentication is required for each access to a secured document. In operation, once a user has been authenticated to access a secured document, authentication of the user would not be required. Also, once the user is authenticated, he/she can access other secured documents without being authenticated again as well.

Generally, there are at least two situations in which the user has to be authenticated before being able to access secured documents. In a first situation, a client machine is coupled to a network (e.g., LAN), a user thereof needs to authenticate himself/herself by providing his/her credential information when it is a first time to use the client machine. Commonly, the credential information is a set of username and password. If the user is registered, the provided credential information will match the user's identity in the server and hence the user will be authenticated. Once the user is authenticated, a user key associated with the user can be activated or authenticated. The user can now use the client machine and subsequently access secured documents. Other possible credential information may include the user's biometric information such as finger print and voice, etc. that can be obtained from a dedicated device attached to the client machine. One such device may be a finger print sensor from DigitalPersona, Inc. at 805 Veterans Boulevard, Suite 301, Redwood City, Calif. 94063. When biometric information of the user is captured, it can verify what the user claims to be. Depending on an implementation, a user key may be locally stored or retrieved remotely. In any event, the user key, before authenticated, is preferably in an illegible format (e.g., encrypted or scrambled with a pass phrase associated with the user) to prevent a possible hacking thereto. The user's authentication or the biometric information of the user may be used to validate, retrieve or authenticate the user key. As a result, an authenticated user key in clear form is readily available for the user to access any secured document. In a second situation, a client machine coupled to a network can accommodate whatever the user thereof intends to do except for requesting a secured document. When it comes to a request to a secured document, the user authentication process is invoked.

Referring back to FIG. 4B, the user authentication process is invoked, communication to a server (e.g., server 104 or 106) is checked at 432. If it is detected that no communication to the server is available, which may mean that the client machine may not be on a network or the server is down or other causes, the user may have at least three options. First, the user can now access only non-secured documents or may generate secured documents at 434 if a public user key is available or retained in the client machine. Second, the user can keep trying to communicate with the server, in which case the process 430 goes back to 432 till a secured communication link is established. Third, the user may take advantage of another feature offered by the present invention, offline access at 433. In short, the user may access a limited number of secured documents on the client machine, the details of which will be provided below.

It is assumed that a secured link (possibly over HTTPS, VPN, SSL) is established between the client machine and the server. Now the process 430 goes to 436 where the user and/or the client machine itself needs to be authenticated. In some cases, it is needed to ensure that a secured document can only be accessed by a user from a permitted machine. Hence, in such cases, it is necessary to authenticate the user as well as the client machine from which the user is to access secured documents.

As far as the user is concerned, the user needs to furnish his/her credential information (e.g., username/password) to be verified. Once the user is authenticated by the server, the client machine needs to be authenticated. To ensure that a user is confined to one or more designated local computers and can only access secured document from these designated local computers, there is a determination of whether the user is using one of the designated local computers to access the secured documents. In operation and at 436, the client machine's identifier (e.g., a number from a network card) is checked by the server to determine: 1) whether this client machine can be used to access secured documents; and 2) whether the combination of the client machine and the user is valid. If the check process is successful, the process 430 goes to 438 otherwise the user can only work on non-secured documents at 434.

A user key associated with the user is authenticated at 438. At this point, the user is able to access secured documents. Certainly, the corresponding access privileges with the user as well as the access rules in a secured document ultimately determine whether the user can open the secured document.

After the user and the client machine the user is using are respectively authenticated or verified, the user key is activated (e.g., ready to use). The user key may have been newly generated or stored in an illegible format. The user authentication process retrieves the user key to a form that can be readily used and/or get the user key to the client machine.

It is assumed that the user is accessing or creating a secured document. At 440, the user access privilege originally set up by an administrator is activated, which determines when, where and what kind of secured documents he/she can access. Likewise, the default access rules for specific folders to store secured documents may be available for viewing or gathered at 442 and could be saved into a temp file to be eventually attached (in an encryption format) to an encrypted document being accessed or created by the user.

Although the description of the process 430 in FIG. 4B is based on the user authorization process formed in conjunction with a server. It is clear to those skilled in the art that the description is readily applied to other means for conducting the user authentication. For example, the user key can be authenticated, validated or retrieved by biometric information of the user as described above.

Referring now to FIG. 4C, there is shown a flowchart of process 450 of accessing a secured document according to one embodiment and shall be understood in conjunction with FIG. 3. At 452, an application is launched with a document being specified, for example, WINWORD.EXE is activated to open a file named xyz.doc. As explained above, a handler from the OS identifies the application and enters the OS wherein the IFS manger is called upon at 454. The IFS manger activates a DSM module at 456 and at the same time, the IFS manger passes the handler to receive at 458 the selected document from a store. As the selected document passes through the DSM module, the selected document is determined whether it is secured or non-secured at 460. In general, there are at least two ways to examine the secure nature of the selected document. A first possible way is that the DSM module looks for a flag at the beginning of the document. As described above, in some secured documents, a flag, such as a set of predetermined data, is placed in the header to indicate that the document being accessed is secured. If no such flag is found, the process 450 goes to 470, namely, the selected documented is assumed non-secured and thus allowed to pass the DSM module and loaded into the application from the IFS manger. A second possible way is that the DSM module looks for a header in a secured document. Being a secured document, there is a header attached to an encrypted data portion. The data format of the header shall be irregular in comparison with the selected document if it were non-secured. If the DSM module determines that the selected document has no irregular data format as required by the application, the process 450 goes to 470, namely, the selected documented is assumed to be non-secured and thus allowed to pass through the DSM module and be loaded into the application from the IFS manger.

Now if it is determined at 460 that the selected document is indeed secured, the process 450 goes to 462 wherein the header or security information therein is decrypted with the authenticated user key. At 464, the access rules in the decrypted security information are retrieved. At 466, the access rules are compared to (or measured against) the access privileges associated with the user. If the measurement fails, which means that the user is not permitted to access this particular document, a notification or alert message may be generated by the DSM module to be displayed to the user at 467. Alternatively, the application itself can display an alerting message when it fails to open the selected document. If the measurement passes successfully, which means that the user is permitted to access this particular document, a file key is retrieved from the security information at 468 and used to decrypt the encrypted data portion in the selected (secured) document by a cipher module activated by the DSM module. As a result, at 470 the decrypted document or clear contents of the selected document is loaded into the application from the IFS manger.

Referring now to FIG. 5A, there is shown a functional block diagram of a server device 500 in which a server module 502 resides in a memory space 503 and is executable by one or more processors 501. The server device 500 also includes a network interface 504 to facilitate the communication between the server 500 and other devices on a network and a local storage space 505. The server module 502 is an executable version of one embodiment of the present invention and delivers, when executed, features/results contemplated in the present invention. According to one embodiment, the server module 502 comprises an administration interface 506, an account manager 508, a user key manager 510, a user monitor 512, a local server manager 514, a partner access manager 516, an access report manager 518, and a rules manager 520.

Administration Interface 506:

As the names suggests, the administration interface 506 facilitates a system administrator to register users and grant respective access privileges to the users and is an entry point to the server module from which all sub-modules or the results thereof can be initiated, updated and managed. In one embodiment, the system administrator sets up hierarchy access levels for various active folders, storage locations, users or group of users. For example, as shown in FIG. 5B.1, different users can be assigned to different access privileges. User A may be an executive or a branch supervisor who has all the access privileges to any secured documents. User B has limited access privileges while everyone in user group C shares the same access privileges. The privileges may include, but not be limited to: open, edit write, print, copy, download and others. Examples of the other privileges are: altering access privileges for other users, accessing secured documents from one or more locations, and setting up a set of access rules for a folder different from those previously set up (perhaps by the system administrator). The respective user IDs assigned to the users facilitate the management of all the users. Unless specifically stated differently, a user or a corresponding user ID is interchangeably used herein to identify a human user, a software agent, or a group of users and/or software agents. Besides a human user who needs to access a secured document, a software application or agent sometimes needs to access the secured document in order to proceed forward. Accordingly, unless specifically stated, the "user" as used herein does not necessarily pertain to a human being. In general, a user who will access a secured document is associated with a user key to allow an encrypted header in a secured document to be unlocked (decrypted). The expiration or regeneration of a user key may be initiated by the system administrator. According to one embodiment, the administration interface 506 is a user graphic interface showing options for various tasks that an authenticated system administrator or operator may need to perform.

Account Manager 508:

Essentially, the account manager is a database or an interface to a database 507 (e.g., an Oracle database) maintaining all the registered users and their respective access privileges, and perhaps corresponding user keys (e.g., private and public keys). In operation, the account manager 508 authenticates a user when the user logs onto the server 500 and also determines if the user can access secured documents from the location the user is currently at. In general, the account manager 508 is where an enterprise may be able to control its users.

User Key Manager 510:

This module is configured to keep a copy of keys for each of the users in an organization. According to one embodiment, the user key manager 510 is not activated to retrieve the keys therein. In some situations, a key can be retrieved by the system administer to access a secured document in case the key in a client machine is corrupted or the user or users who have the access privilege to access the secured document are no longer available. Optionally, the user key manager 510 is configured to expire some or all of the keys therein for security reasons. In one case, a user is no longer with the organization, the corresponding user key can be manually expired in the user key manager 510. In another case, a user's key has been used for a long period, the user key manager is configured to expire the old user's key and replace it with a newly generated key. Such replacement can be made transparent to the user and the new key may be uploaded to a client machine next time the user logs on therefrom. According to another embodiment, the user key manager 510 keeps a private key and a public key for each of the users. The public key is used to encrypt security information in a header and the private key is used to decrypt the security information in the header. FIG. 5B.2 shows an exemplary table that may be maintained by the user key manager 510 in conjunction with account manager 508.

User Monitor 512:

This module is configured to monitor user's requests and whereabouts. Typically, a user is granted to access secured documents from one or more designated locations or networked computers. If a user has a higher access privilege (e.g., to permit to access from other than the locations or networked computers), the user monitor 512 may be configured to ensure that the user can have only one access from one of the registered locations or computers at all times. In addition, the user monitor 512 may be configured and scheduled to periodically push or respond to a pull request of an update of access privileges.

Local Server Manager 514:

This module is designed to be responsible for distributing an appropriate local module for a local server servicing a predetermined location or a predetermined group of users. According to one embodiment, the local server manager 514 replicates some or all of the server module 502 being executed on the server 500 and distributes the replicated copy to all the local servers. As a result, a user can access secured documents anywhere within the network premises covered by the local servers without being authenticated at a single central server, namely the server 500. According to another embodiment, the local server manager 514 replicates some of the server module 502 being executed on the server 500 and distributes the replicated copy to a corresponding local server. In this embodiment, each of the local servers will have its own customized replication from the server module 502. When a user has a sufficiently high access privilege (e.g., to permit to access from more than one locations or one computers) and the user monitor 512 can detect that the user has moved from an originally configured location serviced by one local server to another permitted location serviced by another local server. Upon a notification, the local server manager 514 is configured to reconfigure a local module for the local server that the user has newly contacted. Namely, the user is added as a user to the local server being newly contacted. If it is required that the user can access from only one computer at a time, regardless where it is in an organization, the local server manager 514 can also reconfigure the local module for the local server that the user has previously contacted. As a result, the user is removed from the local server that the user previously contacted.

Partners Access Manager 516:

A special module to manage non-employees accounts. The non-employees may be consultants to a business that requires the consultants to access certain secured documents. The partners access manager 516 generally works in accordance with other modules in the server but puts additional restrictions on such users being directly managed by the partners access manager 516. In one application, the partners access manager 516 generates a request to the user key manager 510 to expire a key or key pair for a consultant when an engagement with the consultant ends.

Access Report Manager 518:

A module is configured to record or track possible access activities and primarily works with a corresponding sub-module in a client module being executed in a client machine. The access report manager 518 is preferably activated by the system administrator and the contents gathered in the access report manager 518 shall be only accessed by the system administrator or with authority.

Rules Manager 520:

In general, the rules manager 520 is an enforcement mechanism of various access rules. According to one aspect, the rules manager 520 is configured to specify rules based on i) data types (e.g., Microsoft Word), ii) group users or individual, iii) applicable rights, and iv) duration of access rules. Typically, a set of rules is a policy. A policy can be enabled, disabled, edited, deployed and undone (e.g., one or two levels). Policies managed by the rules manager 520 operate preferably on a global level. They are downloaded to the client machine during the login process (after the user is authenticated) and can be updated dynamically. In addition, respective policies may be associated with active folders (i.e., those designated places to store secured documents). These polices are also downloaded and updated on the client machine. Simple policies are also embedded in the document and provide document specific policies. According to one embodiment, a header is received by a local server from a client and the access rules from the header are retrieved. The key manager 510 is called upon to decrypt the encrypted security information in the header. The rules manager 520 is also called upon to parse the access rules from the security information and evaluate or measure the access rules against the access privilege of the user to determine whether the secured document can be accessed by the user. If the evaluation or measurement succeeds, a file key is retrieved and sent back to the client.

It should be pointed out that the server module 502 in FIG. 5A lists some exemplary modules according to one embodiment of the present invention and not every module in the server module 502 has to be implemented in order to practice the present invention. Those skilled in the art can understand that given the description herein, various combinations of the modules as well as modifications thereof without departing the spirits of the present invention, may achieve various desired functions, benefits and advantages contemplated in the present invention.

Referring now to FIG. 5B.3, there is shown a flowchart of a process 510 to update a user key 510. As described above, in some cases, there is a need to expire a user key and update the expired user key with a new one. Preferably, the process 510 is proceeded unnoticeably to the user, such as when the user logs onto the server. Optionally, the user is notified of the updating of his/her user key. In general, there can be at least two situations that demand the expiration/updating of a user key. When a user terminates with an organization, for security reasons, it is desirable to invalidate the user key associated with the user. Accordingly, at 511, the process 510 awaits a manual request. When a system administrator is notified of a departing employee, such a manual request can take place.

Alternatively, an organization or the system administrator can set up a time table to expire every user key under the management, say every six months, to replace the expired user key with a new one. At 512, the process awaits a timed request.

In any case, when the process 510 is caused to proceed forward with a request from 511 or 512, at 514, the key manager in the server module is consulted with to look up a user key being targeted or sought. Once the target key is retrieved, a corresponding new key is generated at 516 with a cipher. According to one embodiment, the cipher in use is the same one or substantially identical one used in a client module to encrypt/decrypt the header in a secured document. This will ensure that the newly generated user key is usable when available in a client device. According to another embodiment, a pair of keys associated with a user is updated. Since the two keys are retained in the server and never leave the server, any appropriate cipher may be applicable for use to update the user keys.

Depending on the actual situation and an implementation in which the user key(s) is being replaced, the newly generated key(s) may be kept with the key manager or released to a client machine next time a corresponding user logs on therefrom. At 518, the process 510 awaits a decision whether the newly generated keys remain with the server or is downloadable to a client. When the decision is to retain the newly generated key(s) in the server, the process 510 goes to 522 in which the new key are set to be associated with the same user. When the decision is to release the newly generated keys to the user next time the user logs onto the server, the process 510 goes to 522. At 522, the process 510 awaits a contact from the user. As described above, the user may login on any time from a client machine when he/she needs to access a secured document. When such contact does happen, the server will receive the credential information from the user to ensure that the user is who he/she claims to be. After the user is authenticated, the new keys are encrypted with the credential information at 524. The credential information is provided by the user when requesting for authentication and may include a set of username and password or a biometric feature (e.g., a fingerprint) of the user. Regardless what a cipher is used, the newly generated keys are converted into an illegible format at 524. The encrypted new keys are then uploaded or transmitted to the client machine at 526. Upon receiving the encrypted new keys, the client machine is caused at 528 to decrypt the encrypted new keys to make the new user keys readily available for accessing secured documents or securing documents. In some cases, the client module in the client machine may be scheduled to scan in designated folders all available secured documents whose headers were originally encrypted by the old user key. These documents can be now encrypted again with the new key to ensure that the secured documents are indeed secured. In a preferable embodiment, the updating of user keys can be made to perform transparently as far as the users are concerned. In other words, the users are not aware that the process 510 has happened and the new keys are now installed.

Referring now to FIG. 5B.4, there is shown a flowchart of a server assisted process 530 of accessing secured documents according to one embodiment of the present invention. The process 530 is discussed below with reference to FIG. 3. One of the features in the process 530, as will be further described below, is that a user key or user keys (i.e., a private and a public key) never leave the server where the keys are generated, which may enhance the level of security to the keys.

It is assumed that a user attempts to access secured documents from a client machine and has been authenticated by a server (e.g., server 500) running the access control management. When a secured document is selected, document securing module (DSM) 302 of FIG. 3 determines that a user key is required to access the security information in the secured document. According to this embodiment, the DSM 302 is configured to separate the header from the secured document and then send the header to the server. At 532, such header is received from the client machine. As described before, the header includes security information in an encrypted form. At 534, a private user key associated with the user is retrieved. The private user key can, for example, be retrieved from the key manager. The encrypted security information in the header is then decrypted with the retrieved private user key at 536. As a result, the access rules for this secured document are obtained at 538.

At the same time, the access privilege for the user is retrieved at 540. The access privilege can, for example, be retrieved from the account manager. With the given access privilege and the access rules of the document, an evaluation takes place at 542 to determine if an access right can be granted. If the user's access privilege does not permit access according to the access rules, the process 530 goes to 544. At 544, an error message may be generated to forward to the client machine so that the user knows his access privilege does not allow him to access the selected document. However, on the other hand, if the user's access privilege does permit access according to the access rules, the process 530 goes to 546. At 546, the file key in the security information can be retrieved. At 548, the file key is forwarded to the client machine. With the received file key, the DSM 302 activates the cipher module 310 to decrypt the encrypted data portion of the selected document.

FIG. 5B.5 shows a flowchart of a server assisted process 550 of securing a document according to one embodiment of the present invention. The process 550 is discussed below with reference to FIG. 3. It is assumed that a user has just finished a document and decided to secure the document. One possible way to secure the document, as described above, is to place it in a designated folder that is preset for or associated with a set of access rules. In other words, all documents in the folder may have substantially similar access rules.

Accordingly, the DSM 302 is activated and in return also activates the cipher module 310. If the document is being secured for the first time, the cipher module 310 will generate a new file key. If the file is already in existence, typically the cipher module 310 will not generate a new file key unless requested to do so. Before the process 550 starts, it is also assumed that the user has been authenticated and a link between the client machine and the server is established.

Upon receiving the file key at 552 from the client machine, a public user key associated with the user is retrieved, for example, from the key manager at 554. The access rules for the document are obtained at 556. As described above, there are a number of ways to obtain the access rules. One possible way is to receive them directly from the client machine. Another possible way is to get from the rules manager locally if the document is placed in a folder setup by the system. Given the access rules and the file key, it is now possible to form the security information at 558. The security information is then encrypted with the public user key at 560. In one embodiment similar to FIG. 2C.2, the access rules and the file key are placed in a segment if there are other segments already in the rules block.

At 562, the header for the document is generated. Depending on implementation, the header may include other information (e.g., a flag) that is not encrypted. Alternatively, a user block including the current user is also added into the header. The header is then forwarded at 564 to the client machine where the header is attached or integrated with the encrypted data portion to produce a secured document. It should be noted that the process 550 is also applicable when a secured document is being revised and saved into a store.

Figure 5C:
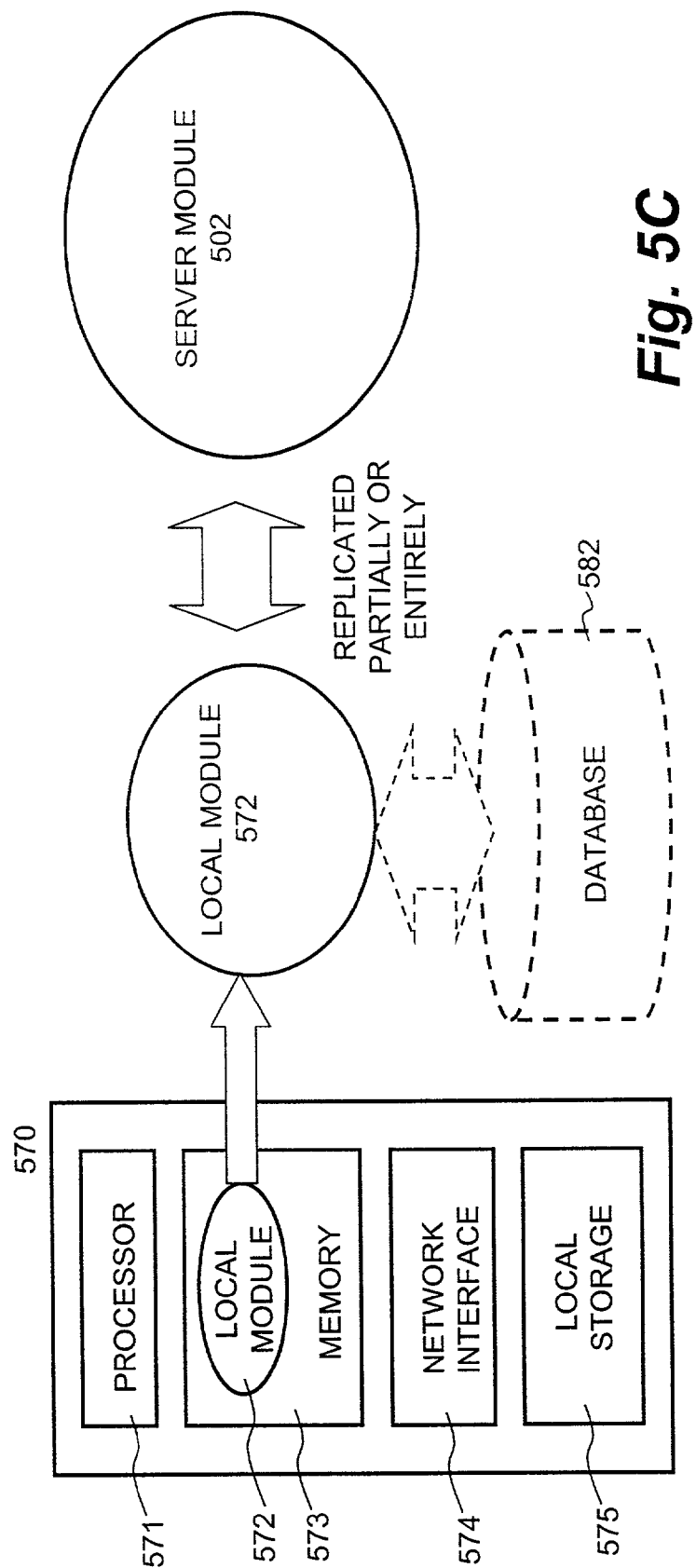
FIG. 5C shows a functional block diagram of a local server device which, in many ways, is similar to that of the server as illustrated in FIG. 5A.

FIG. 5C shows a functional block diagram of a local server device 570. The local server device 570 is generally similar to that of a server as illustrated in FIG. 5A. Accordingly, many parts illustrated in FIG. 5C are not to be described again to avoid obscuring aspects of the present invention. As shown in FIG. 5C, the local server device 570 also executes a module, referred herein as a local module 572 which is configured to be a complete or partial replication of the server module 502 of FIG. 5A. As one of the features in the present invention, the local module 572 provides the dependability, reliability and scalability of the centralized access control management being undertaken by the central server 500 of FIG. 5A. As such, not all authentication requests need to be handled at one central point without losing control of the access control management. As another feature of the present invention, the users are not affected if the central server is brought down for maintenance and the connection to the central server is not available. If a number of local servers are used and each has a replication of the server module, the reliability of servicing the users is greatly enhanced. The possibility that a user wants to access a secured document but could not be authenticated is minimized.

According to one embodiment, the local module 572 is a localized version of some of the server module 502 in the central server 500 and services the users local to the local server. For example, in FIG. 5D, it shows a table 584 of all the users managed by the central server 500. Among the users, John's access privilege 585 is at level 10 (assumed highest) and can access secured documents all days at all times from any of the three locations. Dell's access privilege 586 is at level 1 (assumed lowest) and can access secured documents 8 hours (e.g., 9:00 AM–5 PM) a day, Monday to Friday and only from location A. Mike's access privilege 587 is at level 5 and can access secured documents 12 hours Monday to Saturday and only from locations A and B. If three local servers are employed respectively for the three locations A, B and C, there can be three different access control management possibilities as shown in FIG. 5E, each assigned to one local server. As a result, the local users need only to check with the corresponding local server and none of the users would be affected if other local servers are down for whatever reasons or disconnected from the central server.

FIG. 5F illustrates the accessibility for each of the users. Working with the user monitor 512 in the server module 500, the local module 572 can be configured dynamically. In one embodiment, instead of having three local modules, each permitting John to access from any of the three locations, only one local module is configured to permit John to access form one of the three locations at one time. One of the advantages of the additional security this dynamic configuration mechanism provides is that secured documents can be accessed by John from only one location at a time. In fact, it is not a desirable security feature for a person to log into a system or to access secured documents from two physical locations at the same time. Also for security reasons, it is preferably that a user, regardless of his/her access privilege, be permitted only a single access location at all times.

FIG. 5G shows a dynamic configuration affecting access control management. At one time, the system knows that John is accessing from location A. When John moves to location B, upon his login, the central server (i.e., the user monitor in the server module) detects his whereabouts and thus notifies the local server manager 514 to reconfigure the local modules for both location A and location B. As shown in FIG. 5G, the local access control management 589 in a local server for location A is no longer responsible for John, while the local access control management 590 in a local server for location B takes over to be responsible for John. As a result, John is now permitted to access secured documents from location B but no longer from location A. FIG. 5H illustrates graphically that now John's accessibility has moved from location A to location B. Hence, John together with Mike, both can access secured documents from location B and both of them are temporarily not permitted to access documents from location A.

If Mike happens to move to location A, again the local modules will be reconfigured as shown in FIG. 5I. Because of John's access privilege, John can access secured documents from location C if he moves thereto.

Figure 6A:
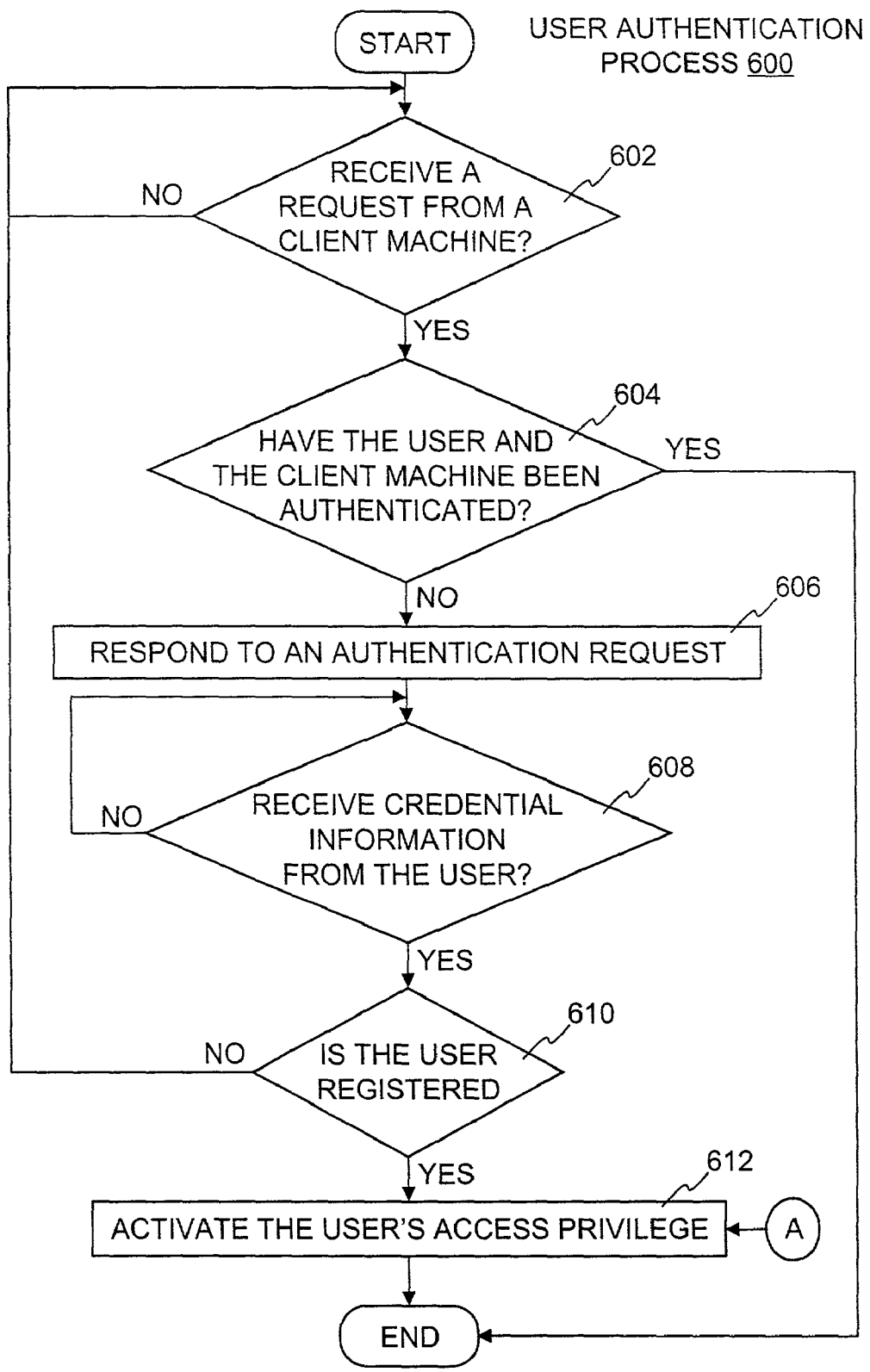
FIG. 6A shows a flowchart of a user authentication process that may be implemented in a central server or a local server.

FIG. 6A shows a flowchart of a user authentication process 600 that may be implemented in the central server 500 or the local server 570. As described above, there are at least two situations that will call upon the process 600—initial login to a networked client machine and first access to a secured document. When either of these situations happens, a client module in the client machine initiates a request that is transmitted to a server running a module providing the access control management to start the process 600.

At 602, the server awaits the request. Upon receiving the request from the client machine, the server proceeds at 604 to determine if the user and the client machine from which the user attempts to access a secured document have been authenticated. If both have already been authenticated, there will be no more authentication processing for either of the user or the client machine. On the other hand, the authentication processing continues when the user and the client machine have not already been authenticated. In one embodiment, the server may initiate a secured link with the client machine if both the server and the client machine are coupled to an open network, such link may be over HTTPS or supported through VPN. Alternatively, there may be a direct link between the client and the server if another authentication means is employed.

At 606, the server responds to the received request with an authentication response. Depending on implementation, such response may be a dialog box to be displayed on the screen of the client machine, a command or other demand. In any case, the response requires that credential information be provided by the user. As described before, the credential information may be a set of username and password or biometric information of the user and must be received from the user at 608 before the authentication may proceed forward.

At 610, upon receiving the credential information, the server needs to determine if the user is an authorized one to access any secured documents maintained in a repository, a local store, the server itself or other device accessible over the network. This may involve in a match of the received credential with what is previously stored in the server. It should be noted that the server may be the central server or a local server. Those skilled in the art can understand that the description is equally applied in either one of the settings. If the match fails, namely the user is unauthorized, the process 600 goes back to the beginning to continue waiting for a request. In other words, the current request to access the secured documents or login to the system is abandoned. If the match successes, the user is recognized as being authorized.

At the same time, the client machine goes to a similar authentication by, perhaps, an IP address thereof, or a network card identification therein, or other means that uniquely identifies the client machine.

With authentication of both the user and the client machine, the process 600 goes to 612 where the user's access privilege is retrieved and activated. Depending on implementation, an activation of the user's access privilege may be a downloading of a file containing the access privilege to the client machine, a decryption of a local file containing the access privilege, or simply an activation of the user in a memory space of the server. In any case, at this point, the user's access privilege is readily accessible, thus permitting the user to access the secured documents from the authenticated client machine.

According to one embodiment, XML-RPC is used to facilitate the communication between a server (e.g., a local server or a central server) and a client machine. XML-RPC is a simple and portable way to make remote procedure calls over HTTP. It can be used with Perl, Java, Python, C, C++, PHP and many other programming languages. In addition, XML-RPC allows software running on disparate operating systems, running in different environments to make procedure calls over a data network. It is remote procedure calling using HTTP as the transport and XML as the encoding. XML-RPC is designed to be as simple as possible, while allowing complex data structures to be transmitted, processed and returned.

In the embodiment of implementing the dynamic configuration mechanism, the user contacts the server from a client machine, the local module in the local server is examined to determine if it has authorization to service the user from the client machine at this location. If not, the local server will communicate with the central server to determine if the local module shall be reconfigured or updated to subsequently support the user from the client machine at this location. With the reconfigured local module, the user and the client machine can be authenticated and the user's access privilege is made accessible, thus permitting the user to access secured documents from the authenticated client machine.

Figure 6B:
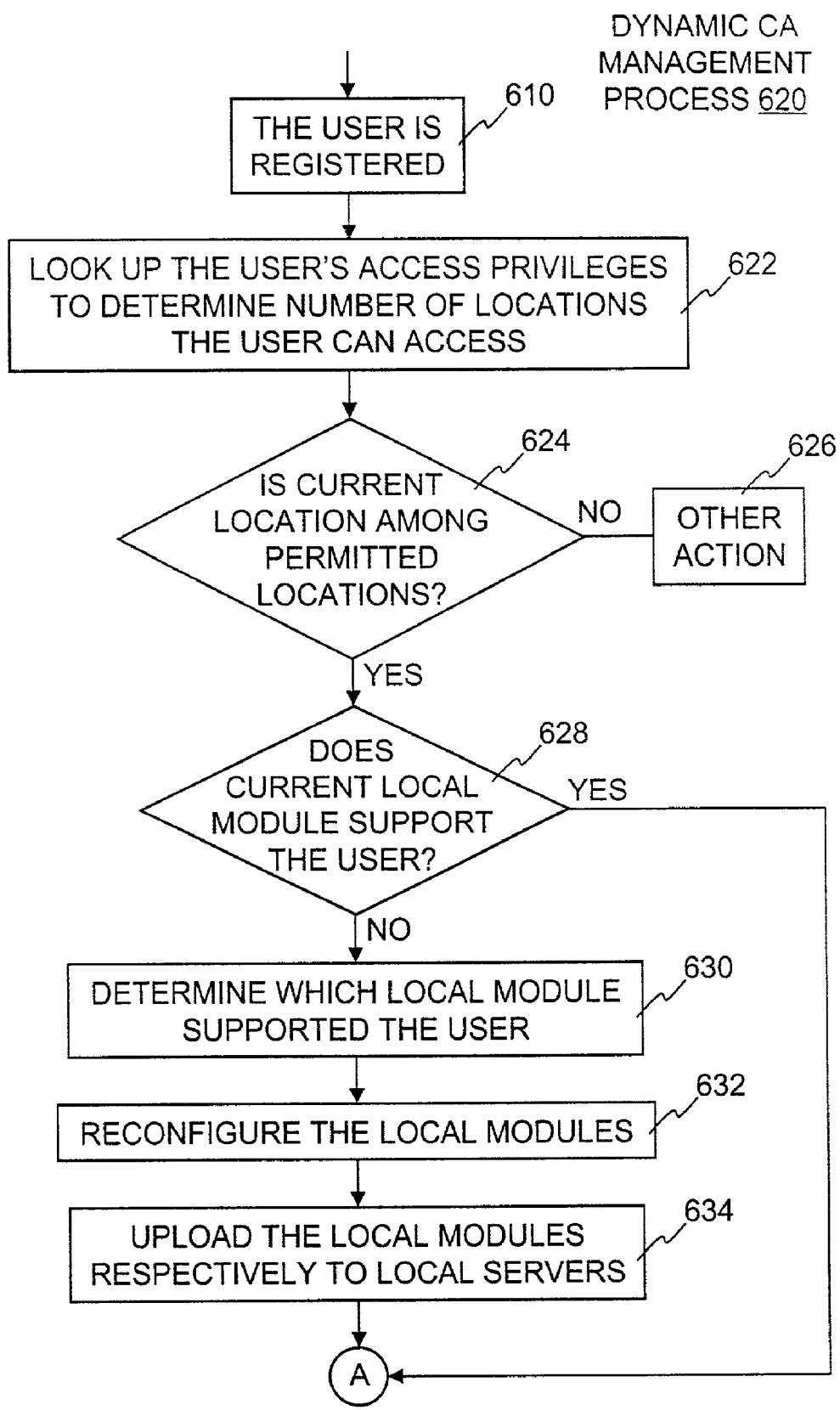
FIG. 6B shows a flowchart of dynamically configuring the access control management process which may be implemented in one or more local servers in conjunction with a central server.

To continue the above embodiment employing one or more local servers to store a localized version of the server module so as to provide only localized access control management. FIG. 6B shows a flowchart of dynamically configuring the access control management process 620 which may be implemented in one or more local servers. The process 620 is performed 610 and 612 of FIG. 6A. At 610, the user has been determined to be authenticated. Next, at 622, the server needs to determine the number of locations or computers from which the user is authorized to access the secured document. In operation, the user's access privilege is examined. Typically, the user's access privilege includes information identifying where (e.g., a permitted location, a geographic location or a local area network) and/or which local computers the user can utilize (e.g. permitted computers). In some case, a user travels a lot among a few offices in several geographic locations, thus the user could be privileged to access secured documents from either one of these geographic locations/computers.

At 624, the current location of the user from which the request is received is examined to determine if it is from the permitted locations in the access privilege. When the current location is not among the permitted locations, the process 620 goes to 626 which may send a notification to the user or simply denies the request. If the current location is among the permitted locations, the process 620 goes to 628 where the local module providing localized access control management at present time is examined (e.g., in the local server manager 514 of FIG. 5A) to determine if the user is under the localized access control management thereof. If the user is under the localized access control management by the local module, the process 620 goes to 612 of FIG. 6A. If the user is not under the localized access control management by the local module, the server needs to determine at 630 which local module previously provided localized access control management for the user. Once the information is gathered from the local modules of different local servers, a reconfiguration of the local modules takes place at 632. Essentially, the user support is removed from one local module and added to another local module, which will be further described in FIG. 6C.

At 634, the newly configured local modules are respectively uploaded to the corresponding local servers. As a result, the user can access secured documents from the new location while the system is assured that only one location/computer access permit is granted at all times.

One of the features in the mechanism of dynamically reconfiguring local modules is the dependability, reliability and scalability of the central access control management by the central server 500 of FIG. 5A. When an enterprise has many employees in multiple locations, the local servers can be added to accommodate the needs without compromising the performance. In fact, the users are not much affected for a predetermined period if the respective connections between the central server and the local servers are not available.

Figure 6C:
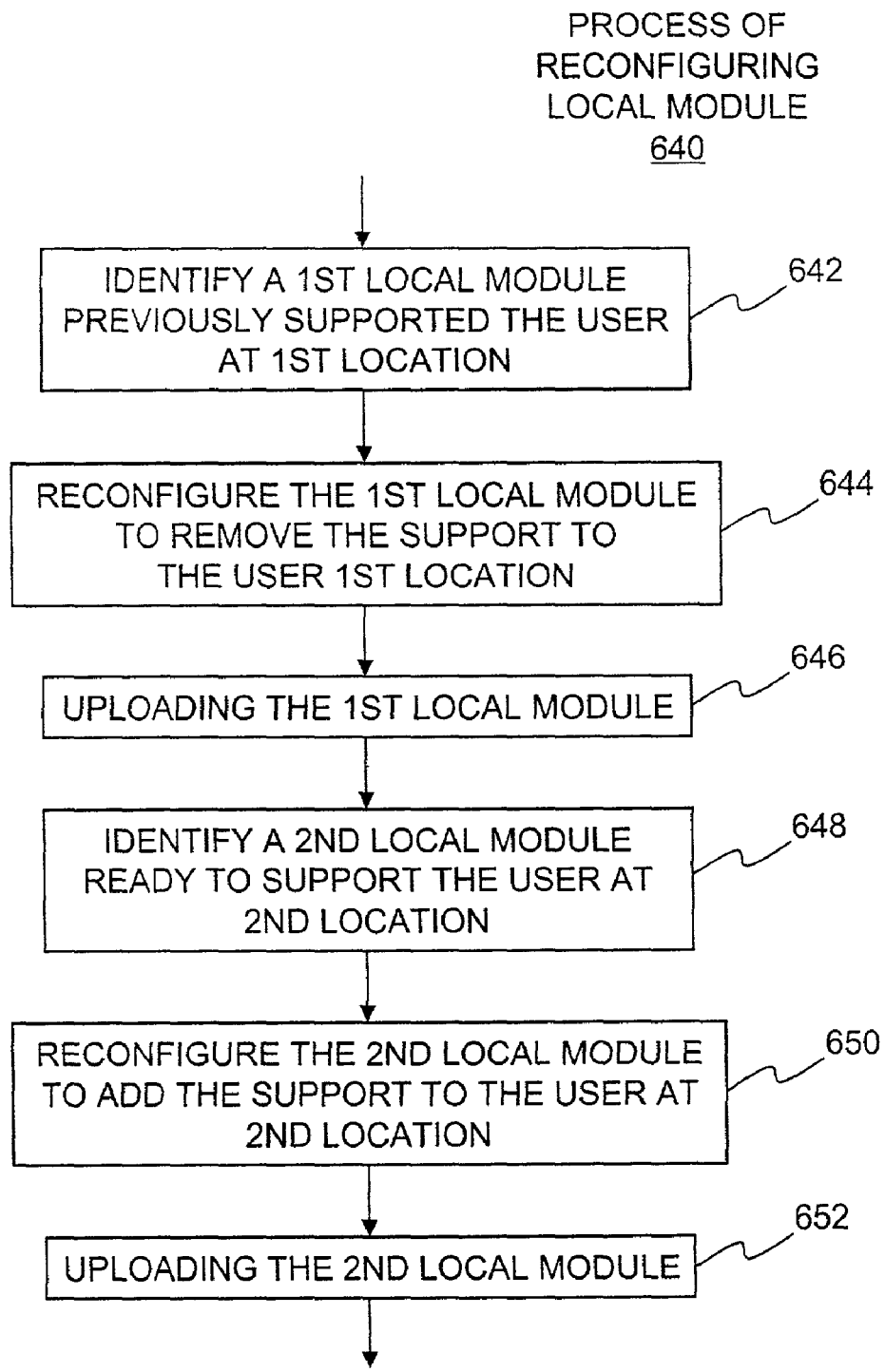
FIG. 6C shows a flowchart of reconfiguring the local modules' process, according to one embodiment, and may be used in FIG. 6B.

FIG. 6C shows a flowchart of reconfiguring the local modules process 640 according to one embodiment. The process 640 is, for example, processing performed at 632 of FIG. 6B. At 642, a first local module that previously supports the user at first location is identified. At 644, the first local module is reconfigured to essentially remove support to the user at the first location. The newly configured first local module is then uploaded at 646 to the corresponding local server to be effective, such that the user is no longer supported at that local server. At 648, a second local module that is to support the user at 2nd location (i.e., currently where the user is) is identified. At 650, the 2nd local module is reconfigured to essentially add the support to the user at the 2nd location. The newly configured second local module is then uploaded at 652 to the corresponding local server to be effective as such the user is now supported at the local server.

The configuration of a user's access to secured document is sometimes referred to as a provisioning process. The dynamic provisioning that has been described above is believed to provide the necessary security means needed by a large enterprise having employees in several locations without the loss of the centralized access control management at a central server. Further, the use of multiple local servers to support the central server can provide increased dependability, reliability and scalability.

Figure 7A:
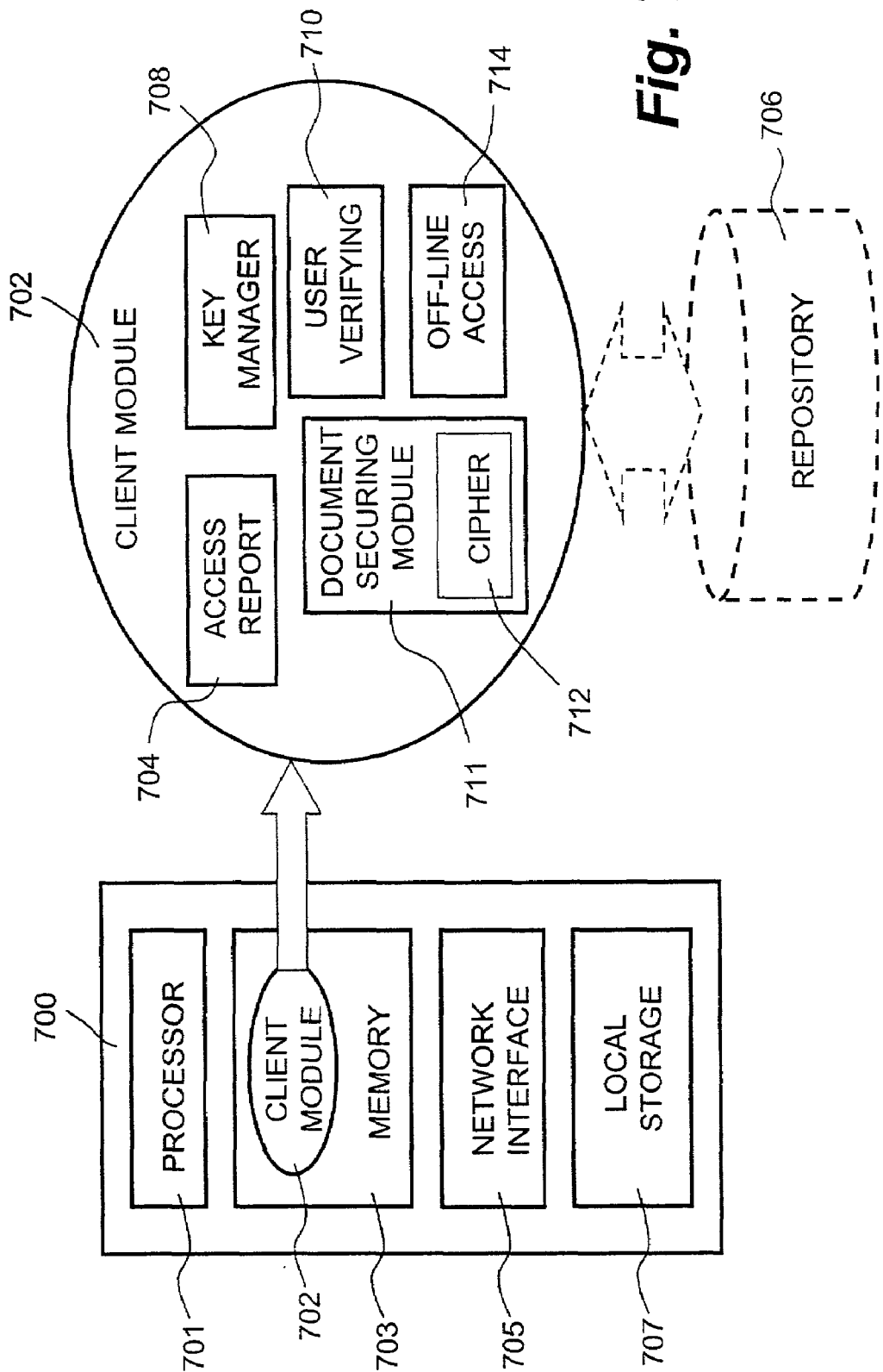
FIG. 7A shows a functional block diagram of a client machine that may be used to practice the present invention.

Referring now to FIG. 7A, there is shown a functional block diagram of a client machine 700. As used herein, the client machine 700 is a computing device primarily used by a user to access secured documents. The client machine 700 can, for example, be a desktop computer, a mobile device or a laptop computer. According to one embodiment, the client machine 700 includes a processor 701, a client module 702, a memory space 703, a network interface 705 and a local store 707. The client module 702 resides in the memory space 703 and, when executed by the processor 701, delivers features, advantages and benefits contemplated in the present invention. Through the network interface 705, the client machine 700 is capable of communicating over a data network with other computers, such as a server. From the client machine 700, a user can access secured documents located in a repository (store) 706 that may be in the client machine 700, another networked device, or other storage means. A client module 702 is an executable version of one embodiment of the present invention. According to one embodiment, the client module 702 includes a number of sub-modules including an access report module 704, a user verifying module 710, a key manager 708, a document securing module 711 and an off-line access manager 714.

Access Report Module 704:

This module is a software agent configured to record access activity and associated with an authenticated user. It reports to an access report module in the central server so that a record may be established as to what secured document has been accessed by which user during what time. In particular, the access report module 704 is activated to capture access activities of the user when the client machine is not networked. The access activities will be later synchronized with the counterpart in the server to facilitate the access control management for the offline access.

Key Manager 708:

One of the purposes for the key manager 708 is to ensure that a secured document is still usable when the secured document is being accessed by an application that suddenly crashes. According to one embodiment, after the encrypted header is decrypted, the file key is then copied or a copy thereof is stored (cached) into the key manager 708. The file key is then used to decrypt the encrypted document. A clear document is now available to the application. If the application crashes due to power outage or interfered by another application or OS, the file key in the header could be damaged. If no copy of the file key is available, the secured document may not be usable any more because the encrypted document would not be decrypted without the file key. In this case, the reserved key maintained in the key manger can be used to replace the damaged key and decrypt the encrypted document. After the user saves the file again, the file key is put back into the header. Another purpose for the key manager 708 is to cache a user key or keys of an authenticated user.

User Verifying Module 710:

This module is responsible for determining if a user who is accessing a secured document has been authenticated otherwise it will initiate a request for authentication with a local server or a central server. In other words, the user verifying module 710 is always consulted before a permission is granted to the user seeking access to a secured document. According to one embodiment, a user key or keys of an authenticated user are stored (cached) in the key manager 708 once the user is authenticated by the user verifying module 710 via the server. When a secured document is accessed, the user key must be retrieved from the key manager 708 to decrypt the encrypted security information in the header of the secured document.

Document Securing Module 711:

As described above, the DSM 711 includes a cipher 712 that is used to generate a file/user key and encrypt/decrypt a document/header. In addition, other securing means may be implemented in the DSM 711, for example, a filter to block copying contents in a secured document into a non-secured document or a link from a secured document/original source to another document or recipient source.

Off-line Access Manager 714:

This module becomes effective only when the networked client machine is off the network, namely, the communication with a local server or a central server is not currently available. For example, a user is on the road and still needs to access some secured documents in a laptop computer. When live consultation is not available, the off-line access manager 714 is activated to ensure that the authorized user still can access the secured document but only for a limited time and perhaps with a limited privilege.

It should be pointed out that the client module 702 in FIG. 7A lists some exemplary sub-modules according to one embodiment of the present invention and not every module in the server module 702 has to be implemented in order to practice the present invention. Those skilled in the art can understand that given the description herein, various combinations of the sub-modules, may achieve certain functions, benefits and advantages contemplated in the present invention.

Figure 7B:
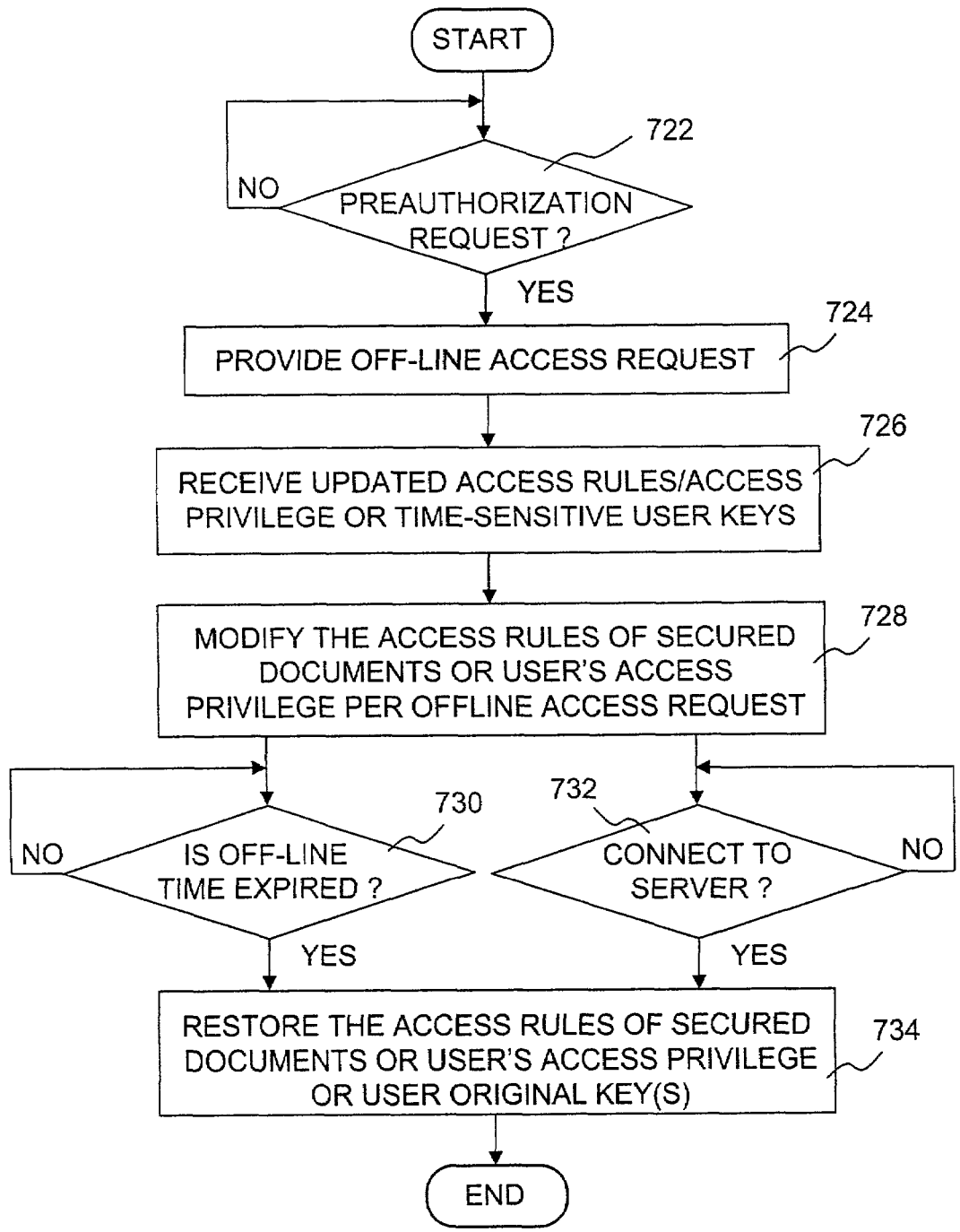
FIG. 7B shows a flowchart of providing off-line access processing in accordance with one embodiment of the present invention.

Many aspects of the operations of the client module 702 have been described above. The client module 702 can provide off-line access capability to a user to permit working with a secured document remotely with respect to a server (i.e., the central server or a local server). The dependence on the server (either one of the central server or local server) is so minimal that the feature can be equally applied to mobile users. Referring now to FIG. 7B, there is shown a flowchart of providing the off-line access process 720 in accordance with one embodiment of the present invention.

When a user has decided to be away from a company's premises for a certain period and will need to access some secured documents in a client machine (e.g., a laptop computer) that is to be carried with the user, the user may get preauthorization from the server before the user disconnects the client machine from the network. At 722, the preauthorization request is made in the client machine to seek an approval of an off-line access request from a server (e.g., a central server or a local server). Depending on an exact implementation, a response to the preauthorization request received from the server may be a dialog box requesting further information from the user for the server to proceed with the off-line access request.

At 724, the user enters necessary information to the off-line access request that may include a specific time period, the user's identity. Perhaps, the off-line access request may also include the names of the secured documents or directories/folders in which secured documents are located and will be accessed off-line. In general, the specific time is manually entered or selected while the user's identity is automatically entered since the user typically has been previously authenticated and the client machine has the user's identity. The off-line access request is then forwarded to the server where the off-line access request is processed. It is assumed that the user is authorized to have such off-line access privilege.

In operation, there are a number of possible ways to enable the off-line access capability. One exemplary way is to place a time-sensitive access amendment to the desired secured documents, for example, the user is pre-authenticated by granting a pair of newly generated short-lived user keys or uploading the user's key or keys in illegible format to the client machine (only the private key is needed if only to access secured documents and both are needed if also to secure newly created documents). In other words, the user's access privilege or the access rules in the selected secured documents have been updated for the requested period. Accordingly, depending on implementation, the amended access rules, the amended access privilege or a time-sensitive user key(s) is received from the server at 726.

Figure 7C:
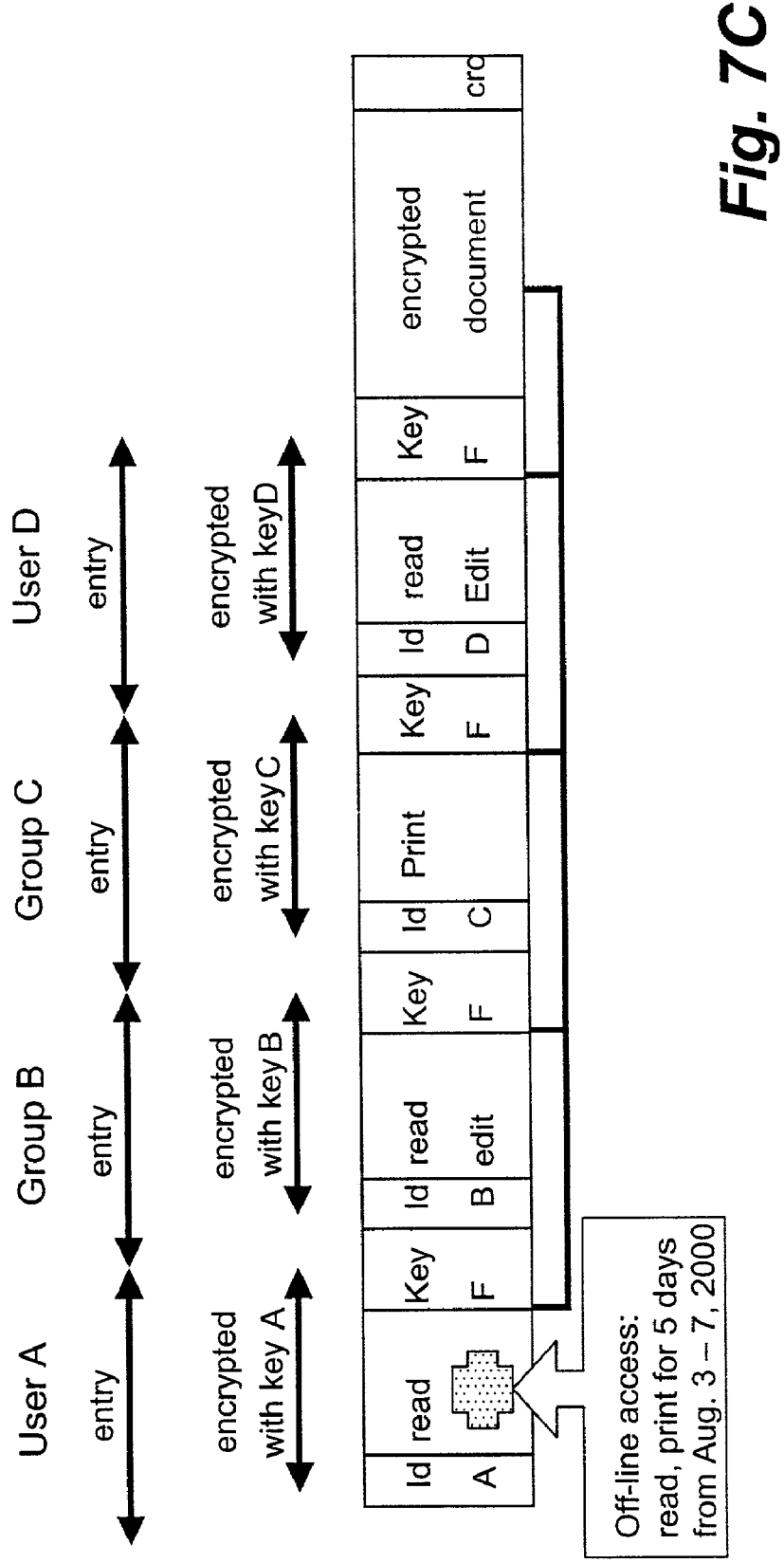
FIG. 7C illustrates an amendment of the access rules placed into a secured document that can be accessed by Users, A, B, C and D, wherein User A has requested off-line access and has been granted the request, while Users B, C and D cannot access the secured documents off-line.

At 728, the original access rules or the user's original access privilege or the original user key(s) is modified, updated or temporarily overwritten. When the amended access rules are received, the secured documents are processed to include the amendments in the access rules so that the user can access them later even when off-line. When the amended access privilege is received, the user's original access privilege is temporarily revised with the received amendments so that the user can now access secured documents off-line. When the time-sensitive user keys are received, the user's original keys are suspended (e.g. put into an illegible format and they are no longer readily usable) and the newly received keys will be effective during the off-line access period. FIG. 7C illustrates that an amendment of the access rules is placed into a secured document that can be accessed by Users, A, B, C and D, wherein User A has requested for the off-line access and has been granted off-line access for the request, while Users B, C and D cannot access the secured documents off-line.

For security purposes, the amendment will typically expire by the end of the specific off-line time regardless if the user has returned or not. This feature is important to the situations in which the client machine (e.g. a laptop computer) is separated from the user or possessed by an unauthorized person, because the secured documents in the client machine can be no longer accessed with the expired user keys even if the user's confidential information (username/password) is hacked. Therefore, at 730, the process 720 keeps checking if the off-line time has ended. If not, the user can still access the secured documents off-line. When it is detected that the off-line time has expired, the process 720 goes to 734 wherein the original access rules are restored so that the secured documents can no longer be accessed off-line.

Similarly, the user's amended access privilege may be configured to expire as well when it is detected that the off-line time is expired, the process 720 goes to 734 wherein the user's original access privilege is restored so that the secured documents can no longer be accessed off-line. According to one embodiment, the amended access privilege is overwritten by the original access privilege.

To account for the situation in which the user may cut short of his/her travel, the process 720 may be configured to initiate the restoration of the original setting for the secured documents or the user's access privilege. At 732, the client machine detects that a connection to a access control server has been made; hence, it is assumed that the off-line access is no longer needed. The process 720 goes to 734 where the restoration of the original setting for the secured documents, the user's access privilege or user's keys takes place. As a result, the secured documents can no longer be accessed off-line from the client machine.

In any case, it is preferable to invoke the access report module 704 in the client module 702 to record the access activities by the user during the off-line access. The next time the user connects to the server, the access activities of the secured documents can be reported to the server to facilitate the access control management or synchronization of the secured documents accessed during the off-line period.

There are numerous functions, benefits and advantages in the present invention. One of the functions, benefits and advantages is that the securing mechanism contemplated in the present invention keep selected digital assets under protection at all times by employing access rules in the secured digital assets. As such only authorized user with authenticated machines can access the secured digital assets. Other functions, benefits and advantages are apparent to those skilled in the art given the detailed description herein.

The present invention may be implemented as a method, a system, a computer readable medium, a computer product and other forms that achieve what is desired herein. Those skilled in the art will understand that the description could be equally applied to or used in other various different settings with respect to various combinations, embodiments or settings provided in the description herein.

The processes, sequences or steps and features discussed above are related to each other and each is believed independently novel in the art. The disclosed processes, sequences or steps and features may be performed alone or in any combination to provide a novel and unobvious system or a portion of a system. It should be understood that the processes, sequences or steps and features in combination yield an equally independently novel combination as well, even if combined in their broadest sense, i.e., with less than the specific manner in which each of the processes, sequences or steps and features has been reduced to practice.

The forgoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

We claim:

1. A method for providing access control management to electronic data, the method comprising:

establishing a secured link between a server providing the access control management and a client machine when an authentication request is received from the client machine, the authentication request including an identifier identifying a user of the client machine to access the electronic data, wherein the electronic data is not from the server but secured in a format including security information and an encrypted data portion, the security information including a file key and access rules and controlling restrictive access to the encrypted data portion;

authenticating the user according to the identifier; and activating a user key after the user is authenticated, wherein the user key is used to access the access rules in the security information, the file key can be retrieved to decrypt the encrypted data portion only if access privilege of the user is successfully measured by the access rules.

2. The method as recited in claim 1 further comprising maintaining an access control management, wherein the access control management comprises:
a rule manager including at least one set of rules for the electronic data; and an administration interface from which the rules for a designated place for the electronic data are created, managed, or updated.

3. The method as recited in claim 2, wherein the designated place is a folder and all files in the folder are subject to the rules.

4. The method as recited in claim 2, wherein the designated place is a repository and all files in the repository are subject to the rules.

5. The method as recited in claim 2, wherein the rule manager provides a graphic user interface from which the rules can be created, managed or updated.

6. The method as recited in claim 5, wherein parameters determining the rules from the graphic user interface are subsequently expressed in a markup language.

7. The method as recited in claim 6, wherein the parameters expressed in the markup language are uploaded to the client machine after the user is authenticated.

8. The method as recited in claim 7, wherein the markup language is Extensible Access Control Markup Language.

9. The method as recited in claim 7, wherein the markup language is selected from a group consisting of HTML, XML and SGML.

10. The method as recited in claim 2, wherein the access control management further comprises a user manager coupled to a database including a list of authorized users and respective access privileges associated with each of the authorized users.

11. The method as recited in claim 10, wherein the authenticating of the user comprises:
looking up in the database for the user; and
getting, from the database, access location information as to where the user is authorized to access the electronic data if information about the user is located in the database.

12. The method as recited in claim 11, wherein the identifier further identifiers the client machine; and wherein the authenticating of the user comprises determining, from the access location information, whether the client machine is permitted by the user to access the electronic data.

13. The method as recited in claim 11, wherein the access location information pertains to locations or specific client machines from which the user is authorized to access the electronic data.

14. The method as recited in claim 1, wherein the user key is in the client machine; and wherein the activating of the user key comprises:
sending an authentication message to the client machine; and
activating the user key with the authentication message.

15. The method as recited in claim 14, wherein the electronic data, when secured, includes a header that further includes the security information being encrypted and a signature signifying that the electronic data is secured.

16. The method as recited in claim 1 further comprising associating the activated user key with the user locally.

17. The method as recited in claim 16, wherein the electronic data, when secured, includes a header that includes the security information being encrypted and a signature signifying that the electronic data is secured; the encrypted security information including the access rules and a file key, and wherein the method further comprises:
receiving the header from the client machine;
decrypting the security information in the header to retrieve the access rules therein; and
retrieving the file key when the access rules are measured successfully against access privilege of the user.

18. The method as recited in claim 17 further comprising sending the file key to the client machine in which the encrypted data portion can be decrypted with the file key by a cipher module executing in the client machine.

19. A method for providing access control management to electronic data in a client machine, the method comprising:
authenticating a user attempting to access the electronic data;
maintaining a private key and a public key, both associated with the user, wherein the electronic data, when secured, includes a header and an encrypted data portion, the header further includes security information controlling who, how, when or where the secured electronic data can be accessed and the encrypted data portion is an encrypted version of the electronic data according to a predetermined cipher scheme;
encrypting the security information with the public key in the client machine when the electronic data is to be written into a store; and
decrypting the security information with the private key in the client machine when the electronic data is to be accessed by an application.

20. The method as recited in claim 19, wherein the authentication of the user comprises:
establishing a link with the client machine from which the user is attempting to access the electronic data;
demanding credential information from the user; and
receiving the credential information from the client machine over the link.

21. The method as recited in claim 20, wherein the credential information includes a pair of username and password provided by the user.

22. The method as recited in claim 20, wherein the credential information includes biometric information captured from the user by an apparatus coupled to the client machine.

23. The method as recited in claim 20, wherein the encrypting of the security information with the public key comprises:
receiving access rules and a file key, wherein the file key has been used to produce the encrypted data portion in the client machine;
including the access rules and the file key into the security information; and
encrypting the security information with the public key.

24. The method as recited in claim 23 further comprising:
generating the header with the security information encrypted therein; and
uploading the header to the client machine where the header is integrated with the encrypted data portion.

25. The method as recited in claim 23, wherein the access rules are expressed in a markup language.

26. The method as recited in claim 25, wherein the markup language is one of Extensible Access Control Markup Language, HTML, XML and SGML.

27. The method as recited in claim 20, wherein the decrypting of the security information with the private key comprises:

receiving the header from the client machine over the link;
parsing the security information from the header; and
decrypting the security information with the private key.

28. The method as recited in claim 27 further comprising:
obtaining access rules from the security information;
determining whether the access rules accommodate access privilege of the user;
when the determining succeeds,
retrieving a file key from the security information; and
sending the file key to the client machine over the link; and
when the determining fails,
sending an error message to the client machine over the link.

29. The method as recited in claim 28, wherein the error message indicates that the user does not have the access privilege to access the electronic data.

30. A method for providing access control management to electronic data, the method comprising:
receiving a request to access the electronic data in a store;
determining security nature of the electronic data by intercepting the electronic data moving from the store through an operating system layer to an application for the data;
when the security nature indicates that the electronic data is secured, the electronic data including a header and an encrypted data portion, the header including security information controlling restrictive access to the encrypted data portion and the encrypted data portion including an encrypted version of the electronic data according to a predetermined cipher scheme,
determining from the security information if the user has necessary access privilege in the operating system layer to access the encrypted data portion without consulting with another machine; and
obtaining a file key and decrypting the encrypted data portion with the file key only after the user is determined to have the necessary access privilege to access the encrypted data portion, and thereafter the application receives the electronic data in clear form.

31. The method as recited in claim 30 further comprising retrieving a user key associated with a user making the request.

32. The method as recited in claim 31 wherein said determining from the security information if the user has necessary access privilege comprises:
decrypting the security information with the user key;
retrieving access rules from the security information; and
measuring the access rules against the access privilege of the user.

33. The method as recited in claim 32 further comprising:
retrieving the file key from the security information if the measuring of the access rules against the access privilege succeeds.

34. The method as recited in claim 32 further comprising:
causing the client machine to display an error message to the user if the measuring of the access rules against the access privilege fails.

35. The method as recited in claim 31, wherein the retrieving of the user key comprises:
establishing a link with a server executing an access control management;
sending to the server an authentication request including an identifier identifying the user for the access control management to authenticate the user;
forwarding the header to the server; and
receiving the file key retrieved from the header.

36. The method as recited in claim 35 further comprising:
activating a cipher module; and
decrypting the encrypted data portion by the cipher module with the received file key.

37. The method as recited in claim 36 further comprising loading the decrypted data portion into the application.

38. The method as recited in claim 31, wherein the retrieving of the user key comprises:
establishing a link with a server executing an access control management;
sending to the server an authentication request including an identifier identifying the user for the access control management to authenticate the user;
receiving an authentication message after the user is authenticated; and
activating the user key locally in the client machine.

39. The method as recited in claim 38, wherein the user key is in an illegible format before the activating of the user key locally in the client machine.

40. A system for providing access control management to electronic data, the system comprising:
a client machine executing a document securing module that operates in a path through which the electronic data is caused to pass when selected, the document securing module determining security nature of the electronic data,
an access control server coupled to the client machine over a network, the access control server including an account manager managing all users who access the electronic data; and
wherein the client machine and a user thereof are caused by the document securing module to be authenticated with the access control server when the security nature indicates that the electronic data is secured; and
wherein access rules in the secured electronic data are retrieved with a user key associated with the user to test against access privilege of the user to determine if the user can access the secured electronic data.

41. The system as recited in claim 40, wherein the access privilege of the user is also tested against other rules imposed by the system.

42. The system as recited in claim 40, wherein the document securing module activates a cipher module to decrypt an encrypted data portion in the secured electronic data with a file key obtained therefrom after the document securing module determines that the access privilege of the user is permitted by the access rules.

43. The system as recited in claim 42, wherein the user key stays in the access control server that receives part of the secured electronic data; and wherein the access rules and the file key are obtained from the part of the secured electronic data.

44. The system as recited in claim 43, wherein the access control server forwards the file key to the client machine in a secured form over the network.

45. The system as recited in claim 42, wherein the user key stays in the client machine and is activated when both the client machine and the user are authenticated by the access control server.

46. A system for providing access control management to electronic data, the system comprising:
a storage device including at least an active place designated for keeping the electronic data secured, the secured electronic data including encrypted security information that further includes at least a set of access rules and a file key, wherein the access rules, expressed in a descriptive language, protects the tile key and controls restrictive access to the secured electronic data;

a client machine coupled to the storage device and executing a document securing module operative to intercept the electronic data when the electronic data is caused to transport from the active place;

an access control server coupled to the client machine over a network and receiving a part of the electronic data including the encrypted security information from the client machine, the encrypted security information being decrypted with a user key associated with a user attempting to access the electronic data after both the user and the client machine are authenticated;

wherein the set of access rules are measured against access privilege of the user in the access control server, if successful, the file key is returned to the client machine to facilitate a recovery of the electronic data in clear mode.

47. A software product to be executable in a computing device for providing access control management to electronic data, the software product comprising:

program code for establishing a secured link between a server supporting the access control management and a client machine when an authentication request is received therefrom, the authentication request including an identifier identifying a user from the client machine to access the electronic data not received from the server but in a secured format including a file key and security information and an encrypted data, the security information including access rules and controlling restrictive access to the encrypted data portion;

program code for authenticating the user according to the identifier; and program code for activating a user key after the user is authenticated, wherein the user key is used to access the access rules in the security information, the file key can be retrieved to decrypt the encrypted data portion only if access privilege of the user is successfully measured by the access rules.

48. The software product as recited in claim 47 further comprising program code for maintaining an access control management, wherein the access control management comprises:

a rule manager including at least one set of rules for the electronic data; and an administration interface from which the rules for a designated place for the electronic data are created, managed or updated.

49. The software product as recited in claim 48, wherein the designated place is a folder and all files in the folder are subject to the rules.

50. The software product as recited in claim 46, wherein the designated place is a repository and all files in the repository are subject to the rules.

51. The software product as recited in claim 46, wherein the rule manager provides a graphic user interface from which the rules can be created, managed or updated.

52. The software product as recited in claim 51, wherein parameters determining the rules from the graphic user interface are subsequently expressed in a markup language.

53. The software product as recited in claim 52, wherein the parameters expressed in the markup language are uploaded to the client machine after the authenticating of the user succeeds.

54. The software product as recited in claim 53, wherein the markup language is Extensible Access Control Markup Language.

55. The software product as recited in claim 53, wherein the markup language is selected from a group consisting of HTML, XML and SGML.

56. The software product as recited in claim 48, wherein the access control management further comprises a user manager coupled to a database including a list of authorized users and respective access privileges associated with each of the authorized users.

57. The software product as recited in claim 56, wherein the program code for authenticating the user comprises:

program code for looking up in the database for the user; and program code for getting, from the database, access location information as to where the user is authorized to access the electronic data if the user is located in the database.

58. The software product as recited in claim 57, wherein the identifier further identifiers the client machine; and wherein the program code for authenticating the user comprises program code for determining, from the access location information, whether the client machine is permitted by the user to access the electronic data.

59. The software product as recited in claim 57, wherein the access location information pertains to locations or specific client machines from which the user is authorized to access the electronic data.

60. The software product as recited in claim 47, wherein the user key is in the client machine; and wherein the program code for activating the user key comprises:

program code for sending an authentication message to the client machine; and program code for activating the user key with the authentication message.

61. The software product as recited in claim 60, wherein the electronic data, when secured, includes a header and an encrypted data portion; and wherein the header includes security information that can be accessed with the activated user key.

62. The software product as recited in claim 47 further comprising program code for associating the activated user key with the user locally.

63. The software product as recited in claim 62, wherein the electronic data, when secured, includes a header and an encrypted data portion, the header includes security information and a file key; and wherein the software product further comprises:

program code for receiving the header from the client machine;

program code for decrypting the header to retrieve, access rules in the security information; and program code for retrieving the file key when the access rules are measured successfully against access privilege of the user.

64. The software product as recited in claim 63 further comprising sending the file key to the client machine in which the encrypted data portion can be decrypted with the file key by a cipher module executing in the client machine.

65. A software product to be executable in a computing device for providing access control management to electronic data in a client machine, the software product comprising:

program code for authenticating a user attempting to access the electronic data;

program code for maintaining a private key and a public key, both associated with the user, wherein the electronic data, when secured, includes a header and an encrypted data portion, the header further includes security information controlling restrictive access to the encrypted data portion and protecting the private key by access rules therein;

program code for encrypting the security information with the public key in the client machine when the electronic data is to be written into a store; and program code for decrypting the security information with the private key in the client machine when the electronic data is to be accessed by an application.

66. The software product as recited in claim 65, wherein the program code for authenticating the user comprises:

program code for establishing a link with the client machine from which the user is attempting to access the electronic data;

program code for demanding credential information from the user; and program code for receiving the credential information from the client machine over the secured link.

67. The software product as recited in claim 66, wherein the credential information includes a pair of username and password provided by the user.

68. The software product as recited in claim 66, wherein the credential information includes biometric information captured from the user by an apparatus coupled to the client machine.

69. The software product as recited in claim 66, wherein the program code for encrypting the security information with the public key comprises:

program code for receiving the access rules and a file key from the client machine over the link, wherein the file key has been used to produce the encrypted data portion in the client machine;

program code for including the access rules and a file key into the security information; and program code for encrypting the security information with the public key.

70. The software product as recited in claim 69 further comprising:

program code for generating the header with the security information encrypted therein; and program code for uploading the header to the client machine where the header is integrated with the encrypted data portion.

71. The software product as recited in claim 70, wherein the access rules are expressed in a markup language.

72. The software product as recited in claim 71, wherein the markup language is one of Extensible Access Control Markup Language, HTML, XML and SGML.

73. The software product as recited in claim 66, wherein the program code for decrypting the security information with the private key comprises:

program code for receiving the header from the client machine over the link;

program code for parsing the security information from the header; and program code for decrypting the security information with the private key.

74. The software product as recited in claim 73 further comprising:

program code for obtaining access rules from the security information;

program code for determining whether the access rules accommodate access privilege of the user;

when the determining program code is executed successfully, program code for retrieving a file from the security information; and program code for sending the file key to the client machine over the link; and when the determining program code is executed unsuccessfully, program code for sending an error message to the client machine over the link.

75. The software product as recited in claim 74 wherein the error message indicate that the user does not have the access privilege to access the electronic data.

76. A software product to be executable in a computing device for providing access control management to electronic data, the software product comprising:

program code for receiving a request to access the electronic data in a store;

program code for determining security nature of the electronic data by intercepting the electronic data moving from the store through an operating system layer to an application for the data;

when the security nature indicates that the electronic data is secured, wherein the electronic data including a header and an encrypted data portion, the header including security information and the encrypted data portion including an encrypted version of the electronic data according to a predetermined encryption scheme, program code for determining from the security information if the user has necessary access privilege in the operating system layer to access the encrypted data portion; and program code for a file key from the security information and decrypting the encrypted data portion only after the access privilege of the user is permitted in view of the security information, and thereafter the application receives the electronic data in clear form.

77. The software product as recited in claim 76 further comprising program code for retrieving a user key associated with a user making the request.

78. The software product as recited in claim 77 wherein the program code for determining from the security information, if the user has necessary access privilege, comprises:

program code for decrypting the security information with the user key;

program code for retrieving access rules from the security information; and program code for measuring the access rules against the access privilege of the user.

79. The software product as recited in claim 78 further comprising:

program code for causing the client machine to display an error message to the user if the measuring of the access rules against the access privilege fails.

80. The software product as recited in claim 78, wherein the program code for retrieving the user key comprises:

program code for establishing a link with a server executing an access control management;

program code for sending to the server an authentication request including an identifier identifying the user for the access control management to authenticate the user;

program code for forwarding the header to the server; and program code for receiving a file key retrieved from the header.

81. The software product as recited in claim 80 further comprising:

program code for activating a cipher module; and program code for decrypting the encrypted data portion by the cipher module with the received file key.

82. The software product as recited in claim 81 further comprising program code for loading the decrypted data portion into the application.

83. The software product as recited in claim 77, wherein the program code for retrieving the user key comprises:
program code for establishing a link with a server executing an access control management;
program code for sending to the server an authentication request including an identifier identifying the user for the access control management to authenticate the user;
program code for receiving an authentication message after the user is authenticated; and
program code for activating the user key locally in the client machine.

84. The software product as recited in claim 83, wherein the user key is in an illegible format before the activating of the user key locally in the client machine.

85. The software product as recited in claim 83, wherein the computing device is a media player having a network capacity, the media player generating audio and/or video from the electronic data when the software product is executed in the media player.

* * * * *

UNITED STATES PATENT AND TRADEMARK OFFICE
CERTIFICATE OF CORRECTION

PATENT NO. : 7,260,555 B2  Page 1 of 1
APPLICATION NO. : 10/076254
DATED : August 21, 2007
INVENTOR(S) : Rossmann et al.

It is certified that error appears in the above-identified patent and that said Letters Patent is hereby corrected as shown below:

On the title page, Item (75), the Inventor section, please replace "Michael Michio Ouya" with --Michael Michio Ouye--.

In claim 63, column 40, line 53, please replace "program code for decrypting the header to retrieve, access" with --program code for decrypting the header to retrieve access--.

In claim 71, column 41, line 48, please replace "The software product as recited in claim 70" with --The software product as recited in claim 72--.

Signed and Sealed this

Fifteenth Day of April, 2008

JON W. DUDAS
*Director of the United States Patent and Trademark Office*